United States Patent
Piao

(10) Patent No.: US 11,212,556 B2
(45) Date of Patent: Dec. 28, 2021

(54) ENCODING METHOD AND DEVICE THEREFOR, AND DECODING METHOD AND DEVICE THEREFOR

(71) Applicant: SAMSUNG ELECTRONICS CO., LTD., Suwon-si (KR)

(72) Inventor: Yinji Piao, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/979,993

(22) PCT Filed: Mar. 12, 2019

(86) PCT No.: PCT/KR2019/002830
§ 371 (c)(1),
(2) Date: Sep. 11, 2020

(87) PCT Pub. No.: WO2019/177331
PCT Pub. Date: Sep. 19, 2019

(65) Prior Publication Data
US 2021/0051343 A1    Feb. 18, 2021

Related U.S. Application Data

(60) Provisional application No. 62/641,670, filed on Mar. 12, 2018.

(51) Int. Cl.
*H04N 19/61* (2014.01)
*H04N 19/103* (2014.01)
(Continued)

(52) U.S. Cl.
CPC .......... *H04N 19/61* (2014.11); *H04N 19/103* (2014.11); *H04N 19/136* (2014.11); *H04N 19/176* (2014.11)

(58) Field of Classification Search
None
See application file for complete search history.

(56) References Cited

U.S. PATENT DOCUMENTS

| | | |
|---|---|---|
| 9,300,957 B2 | 3/2016 | Cheon et al. |
| 10,194,173 B2 | 1/2019 | Cheon et al. |

(Continued)

FOREIGN PATENT DOCUMENTS

| | | |
|---|---|---|
| KR | 10-0865690 B1 | 10/2008 |
| KR | 10-2012-0038365 A | 4/2012 |

(Continued)

OTHER PUBLICATIONS

International Search Report (PCT/ISA/210) dated Jun. 18, 2019 by the International Searching Authority in counterpart International Patent Application No. PCT/KR2019/002830.

(Continued)

Primary Examiner — Christopher G Findley
(74) Attorney, Agent, or Firm — Sughrue Mion, PLLC

(57) ABSTRACT

Provided is a video decoding method including determining encoding modes applicable to a current picture according to a temporal layer depth of the current picture, generating a prediction block and a transform block for blocks included in the current picture according to the encoding modes applicable to the current picture, and reconstructing the current picture by using the prediction block and the transform block.

13 Claims, 24 Drawing Sheets

(51) Int. Cl.
*H04N 19/136* (2014.01)
*H04N 19/176* (2014.01)

(56) References Cited

U.S. PATENT DOCUMENTS

| | | | |
|---|---|---|---|
| 2016/0065978 A1* | 3/2016 | Hiwatashi | H04N 19/44 375/240.02 |
| 2017/0026643 A1 | 1/2017 | Lee et al. | |
| 2017/0230689 A1 | 8/2017 | Lee et al. | |
| 2020/0304788 A1* | 9/2020 | He | H04N 19/463 |

FOREIGN PATENT DOCUMENTS

| KR | 10-2014-0073530 A | 6/2014 |
|---|---|---|
| KR | 10-2015-0051964 A | 5/2015 |
| KR | 10-2017-0118673 A | 10/2017 |
| WO | 2017/209394 A1 | 12/2017 |

OTHER PUBLICATIONS

Written Opinion (PCT/ISA/237) dated Jun. 18, 2019 by the International Searching Authority in counterpart International Patent Application No. PCT/KR2019/002830.

* cited by examiner

FIG. 12

| BLOCK SHAPE<br>DEPTH | 0: SQUARE | 1: NS_VER | 2: NS_HOR |
|---|---|---|---|
| DEPTH D | 1200 | 1210 | 1220 |
| DEPTH D+1 | 1202 | 1212 | 1222 |
| DEPTH D+2 | 1204 | 1214 | 1224 |
| ... | ... | ... | ... |

ENCODING METHOD AND DEVICE THEREFOR, AND DECODING METHOD AND DEVICE THEREFOR

TECHNICAL FIELD

The present disclosure relates to video encoding and decoding methods, and more particularly, to methods of determining encoding modes applicable to a current picture according to temporal layer depths of the current picture.

BACKGROUND ART

A video having high image quality requires a large amount of data when being encoded. However, as a bandwidth allowed for transmitting video data is limited, a data rate applied in the transmission of video data may be restricted. Therefore, for efficient transmission of video data, methods of encoding and decoding video data that minimize gradation of image quality and have an increased compression rate are required.

The video data may be compressed by removing spatial redundancy and temporal redundancy between pixels. As neighboring pixels generally have common characteristics, encoding information is transmitted in data units including pixels to remove redundancy between the neighboring pixels.

Pixel values of the pixels included in the data units are not directly transmitted, and a method required for obtaining the pixel values is transmitted. A prediction method of predicting a pixel value to be similar to an original value is determined for each data unit, and encoding information regarding the prediction method is transmitted from an encoder to a decoder. In addition, as a predicted value is not completely equal to the original value, residual data regarding a difference between the original value and the predicted value is transmitted from the encoder to the decoder.

As the prediction becomes more precise, encoding information required for specifying the prediction method increases, but a size of the residual data decreases. Therefore, the prediction method is determined in consideration of the encoding information and the size of residual data. Particularly, data units split from a picture have various sizes, and as a size of a data unit increases, accuracy of prediction is likely to decrease, but encoding information also decreases. Accordingly, a size of a block is determined according to the characteristics of the picture.

In addition, prediction methods include intra-prediction and inter-prediction. Intra-prediction is a method of predicting pixels of a block from neighboring pixels of the block. Inter-prediction is a method of predicting pixels with reference to pixels of another picture to which a picture including the block refers. Therefore, spatial redundancy is removed by intra-prediction, and temporal redundancy is removed by inter-prediction.

As the number of prediction methods increases, an amount of encoding information for indicating the prediction methods increases. Accordingly, a size of the encoding information applied to the block may also be reduced by predicting the encoding information from another block.

As the loss of video data is permitted to an extent that human visual perception does not recognize the loss, an amount of the residual data may be reduced by performing lossy compression on the residual data according to processes of transformation and quantization.

DESCRIPTION OF EMBODIMENTS

Technical Problem

According to the present disclosure, provided are a video encoding method and a video encoding device for determining encoding modes applicable to a current picture according to a temporal layer depth of the current picture. Also, provided are a video decoding method and a video decoding device for determining encoding modes applicable to a current picture according to a temporal layer depth of the current picture. Furthermore, provided is a computer-readable recording medium having recorded thereon a program for executing, on a computer, a video encoding method and a video decoding method according to an embodiment of the present disclosure.

Solution to Problem

According to the present disclosure, provided is a video decoding method including determining encoding modes applicable to a current picture according to a temporal layer depth of the current picture, generating a prediction block and a transform block for blocks included in the current picture according to the encoding modes applicable to the current picture, and reconstructing the current picture by using the prediction block and the transform block.

According to the present disclosure, provided is a video decoding device including at least one memory and a processor configured to execute instructions stored in the at least one memory, wherein the instructions involve determining encoding modes applicable to a current picture according to a temporal layer depth of the current picture, generating a prediction block and a transform block for blocks included in the current picture according to the encoding modes applicable to the current picture, and reconstructing the current picture by using the prediction block and the transform block.

According to the present disclosure, provided is a video encoding method including determining a plurality of encoding modes applicable to a current picture according to a temporal layer of the current picture, determining an encoding mode applied to blocks included in the current picture from the plurality of encoding modes applicable to the current picture, and generating a bitstream including information indicating the encoding mode applied to the blocks included in the current picture.

According to the present disclosure, provided is a video encoding device including at least one memory and a processor configured to execute instructions stored in the at least one memory, wherein the instructions involve determining a plurality of encoding modes applicable to a current picture according to a temporal layer depth of a current picture, determining an encoding mode applied to blocks included in the current picture from the plurality of encoding modes applicable to the current picture, and generating a bitstream including information indicating the encoding mode applied to the blocks included in the current picture.

There is provided a computer-recordable recording medium having recorded thereon a program for executing the video encoding method and the video decoding method.

Technical goal of the present disclosure is not limited to the technical goals described above, and other technical goals may be derived from embodiments disclosed hereinafter.

Advantageous Effects of Disclosure

According to the present disclosure, an encoding mode applicable to a picture is determined according to a temporal layer depth of the picture. Accordingly, as encoding information indicating whether the encoding mode is to be applied to the blocks included in a picture of a specific temporal layer depth is skipped, an encoding rate may be improved.

BRIEF DESCRIPTION OF DRAWINGS

FIG. 12 illustrates a process of determining a depth of a coding unit as a shape and size of coding unit change, when the coding unit is recursively split such that a plurality of coding units are determined, according to an embodiment.

BEST MODE

Figure 1A:
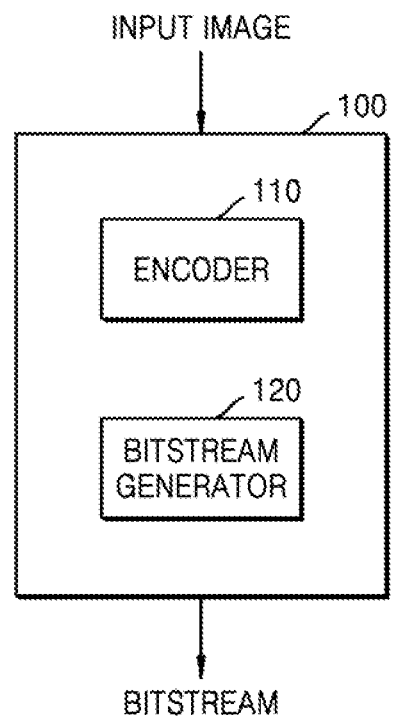
FIG. 1A is a block diagram of an image encoding device based on coding units according to a tree-structure, according to an embodiment of the present disclosure.

According to the present disclosure, provided is a video decoding method including determining encoding modes applicable to a current picture according to a temporal layer of the current picture, generating a prediction block and a transform block for blocks included in the current picture according to the encoding modes applicable to the current picture, and reconstructing the current picture by using the prediction block and the transform block Mode of Disclosure The advantages and features of the embodiments disclosed herein and methods of achieving the advantages and features will be described more fully with reference to the accompanying drawings, in which embodiments of the present disclosure are shown. The present disclosure may, however, be embodied in many different forms and should not be construed as being limited to the embodiments set forth herein; rather these embodiments are provided so that this disclosure will be thorough and complete, and will fully convey the concept of the disclosure to one of ordinary skill in the art.

The terms used herein will be briefly described, and the embodiments disclosed herein will be described in detail.

The terms used herein are selected from among common terms that are currently widely used in consideration of their function in the present disclosure. However, the terms may be different according to an intention of one of ordinary skill in the art, a precedent, or the advent of new technology. Also, in particular cases, the terms are discretionally selected by the applicant of the present disclosure, and the meaning of those terms will be described in detail in the corresponding part of the detailed description. Therefore, the terms used in the present disclosure are not merely designations of the terms, but the terms are defined based on the meaning of the terms and content throughout the present disclosure.

In the present specification, an expression used in the singular encompasses the expression of the plural, unless it has a clearly different meaning in the context.

It will be further understood that when a part "includes" or "comprises" an element, unless otherwise defined, the part may further include other elements, not excluding the other elements. The term "unit" in the specification means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, and variables. A function provided by the components and "units" may be associated with the smaller number of components and "units", or may be divided into additional components and "units".

"A current block" indicates one of a coding unit, a prediction unit, and a transform unit that is currently encoded or decoded. For convenience of explanation, when other types of blocks such as a prediction unit and transform unit need to be distinguished, "a current encoding block", "a current prediction block", and "a current transform block" may be used. "A lower block" indicates a data unit split from the "current block". "An upper block" indicates a data unit including the "current block".

Hereinafter, "sample" indicates data to be processed that is assigned to a sampling location of an image. For example, a pixel value in an image of a spatial region and transform coefficients on a transform region may be samples. A unit including at least one of the samples may be defined as a block.

Hereinafter, embodiments will be described in detail with reference to the accompanying drawings such that one of ordinary skill in the art may easily understand the present disclosure. For clarity of explanation, components not related to the description will be omitted from the drawings.

FIG. 1A is a block diagram of an image encoding device 100 based on coding units according to a tree structure, according to an embodiment of the present disclosure.

The image encoding device 100 includes an encoder 110 and a bitstream generator 120.

The encoder 110 may first split a picture into one or more slices or one or more tiles. The encoder 110 then splits the picture, or a slice or tile included in the picture, into a plurality of largest coding units, according to a size of a largest coding unit. A largest coding unit is a data unit having sizes of 32×32, 64×64, 128×128, 256×256, and the like, and may be a square data unit having horizontal and vertical sizes of 2 square. The encoder 110 may provide largest coding unit size information, which indicates a size of the largest coding unit, to the bitstream generator 120. The bitstream generator 120 may have the largest coding unit size information included in a bitstream.

The encoder 110 determines coding units by splitting the largest coding unit. Whether to split the encoding mode is determined by rate-distortion optimization according to whether it is efficient to split the coding unit. Split information, which indicates whether the coding unit is split, may be generated. The split information may be represented in the form of a flag.

The coding unit may be split in various methods. For example, a square coding unit may be split into four square coding units of half width and half height. The square coding unit may be split into two square coding units of half width. The square coding unit may be split into two square coding units of half height. The square coding unit may be split into three coding units by splitting the width or height by 1:2:1.

A rectangular coding unit having a width twice a height may be split into two square coding units. A rectangular coding unit having a width of twice a height may be split into two rectangular coding units each having a width of four times a height. The rectangular coding unit having the width of twice the height may be split into two rectangular coding units and one square coding unit by splitting the width by 1:2:1.

Likewise, a rectangular coding unit having a height of twice a width may be split into two square coding units. In addition, the rectangular coding unit having the height of twice the width may be split into two rectangular coding units each having a height of four times a width. Likewise, the rectangular coding unit having the height of twice the width may be split into two rectangular coding units and one square coding unit by splitting the height by 1:2:1.

When two or more split methods may be used in the image encoding device 100, information regarding a split method usable on the coding unit, from split methods usable in the image encoding device 100, may be determined for each picture. Accordingly, it may be determined to use only specific methods for each picture. When the image encoding device 100 uses only one split method, the information regarding the split method usable to the coding unit is not separately determined.

A coding unit of a specific size may be split by a specific split method. For example, when a size of the coding unit is 256×256, a coding unit may be set to be split only into four square coding units of half heights and half widths.

When the split information of the encoding indicates that the coding unit is split, split shape information indicating a split method of the coding unit may be generated. When there is only one split method usable in a picture including the coding unit, the split shape information may not be generated. When the split method is determined in adaptation with encoding information around the coding unit, the split shape information may not be generated.

As described above, according to a largest size of the coding unit, image data of the current picture is split into the largest coding unit. The largest coding unit may include coding units hierarchically split from the largest coding unit. A shape and position of a lower coding unit may be determined according to split shape of an upper coding unit. A smallest size of a coding unit for restricting split of the coding unit may be set in advance.

The encoder 110 compares encoding efficiency when the coding unit is hierarchically split to encoding efficiency when the coding unit is not split. According to a comparison result, the encoder 110 determines whether to split the coding unit. When it is determined that it is more efficient to split the coding unit, the encoder 110 hierarchically splits the coding unit. When it is determined that not to split the coding unit is more efficient according to the comparison result, the coding unit is not split. Whether to split the coding unit may be determined independent of whether to split another coding unit adjacent to the coding unit.

The coding unit that is finally split may be predicted by intra-prediction or inter-prediction. Intra-prediction is a method of predicting samples of a prediction unit by using reference samples around the prediction unit. Inter-prediction is a method of predicting samples of a prediction unit by obtaining a reference sample from a reference picture to which a current picture refers.

For intra-prediction, the encoder 110 may apply a plurality of intra-prediction methods to the prediction unit and select a most efficient intra-prediction method. An intra-prediction method includes a direct current (DC) mode, a planar mode, a directional mode such as a vertical mode and a horizontal mode, and the like.

Intra-prediction may be performed for each prediction unit when a reconstructed sample around the coding unit is used as a reference sample. However, when the reconstructed sample in the coding unit is used as a reference sample, reconstruction of the reference sample in the coding unit is prior to prediction, and thus, a prediction of the prediction unit may be dependent on a transformation order of the transform unit. Therefore, when a reconstructed sample in the coding unit is used as a reference sample, only an intra-prediction method for transform units corresponding to the prediction unit may be determined for the prediction unit, and intra-prediction may be substantially performed on each transform unit.

The encoder 110 may select a most efficient inter-prediction method by determining an optimal motion vector and a reference picture. For inter-prediction, the encoder 110 may determine a plurality of motion vector candidates from coding units spatially and temporally adjacent to a current coding unit, and then determine a most efficient motion vector as a motion vector. Likewise, a plurality of reference picture candidates may be determined from coding units spatially and temporarily adjacent to the current coding unit, and a most efficient reference picture may be determined therefrom. According to embodiments, the reference picture may be determined from reference picture lists predetermined for the current picture. According to embodiments, for the accuracy of prediction, a most efficient motion vector from the plurality of motion vector candidates may be determined as a prediction motion vector, and the motion vector may be determined by correcting the prediction motion vector. Inter-prediction may be parallel performed on each prediction unit in the coding unit.

The encoder 110 may reconstruct the coding unit by only obtaining information indicating the motion vector and the reference picture, according to a skip mode. According to the skip mode, except the information indicating the motion vector and the reference picture, all encoding information including a residual signal is omitted. As the residual signal is omitted, the skip mode may be used when the accuracy of prediction is very high.

Partition modes being used may be restricted according to prediction methods for the prediction unit. For example, only a partition mode for a prediction unit having sizes of 2N×2N and N×N is applied to intra-prediction, but on the other hand, a partition mode for a prediction unit having sizes of 2N×N, N×2N, and N×N may be applied to inter-prediction. In addition, only a partition mode for a prediction unit having a size of 2N×2N may be applied to the skip mode of inter-prediction. In the image encoding device 100, partition modes allowed for the prediction methods may be modified according to encoding efficiencies.

The image encoding device 100 may perform transform based on the coding unit. Through a preset process, the image encoding device 100 may transform a residual data that is a difference value between an original value and a prediction value for pixels included in the coding unit. For example, the image encoding device 100 may perform lossy compression on the residual data through quantization and discrete cosign transform (DCT)/discrete sign transform (DST). Alternatively, the image encoding device 100 may perform lossless compression on the residual data without quantization.

In conclusion, the encoder 110 determines a most efficient prediction method for the current coding unit from a plurality of intra-prediction methods and inter-prediction methods. In addition, the encoder 110 determines the prediction method of the current coding unit according to an encoding efficiency based on a prediction result. Likewise, the encoder 110 may determine a transform method according to an encoding efficiency based on a transform result. An encoding efficiency of the coding unit is finally determined based on a way of determining the prediction method and transform method of a coding unit with a highest efficiency. The encoder 110 determines a hierarchical structure of the largest coding unit according to the encoding efficiency of the coding unit that is finally split.

The encoder 110 may measure the encoding efficiency of the coding unit, prediction efficiency of prediction methods and the like by using rate-distortion optimization based on Lagrangian Multiplier.

The encoder 110 may generate split information whether the coding unit is to be split, according to the hierarchical structure of the determined largest coding unit. In addition, with respect to the coding unit that is completely split, the encoder 110 may generate partition mode information for determining the prediction unit and transform unit split information for determining the transform unit. Furthermore, when there are two or more methods of splitting the coding unit, the encoder 110 may generate split shape information indicating the split methods, together with the split information. In addition, the encoder 110 may generate information regarding the prediction method and the transform method respectively used for the prediction unit and the transform unit.

The bitstream generator 120 may output information, which are generated by the encoder 110, in the form of a bitstream, according to the hierarchical structure of the largest coding unit.

A method of determining a coding unit, a prediction unit, and a transform unit according to the tree structure of the largest coding unit according to an embodiment will be described in detail with reference to FIGS. 3 to 12.

Figure 1B:
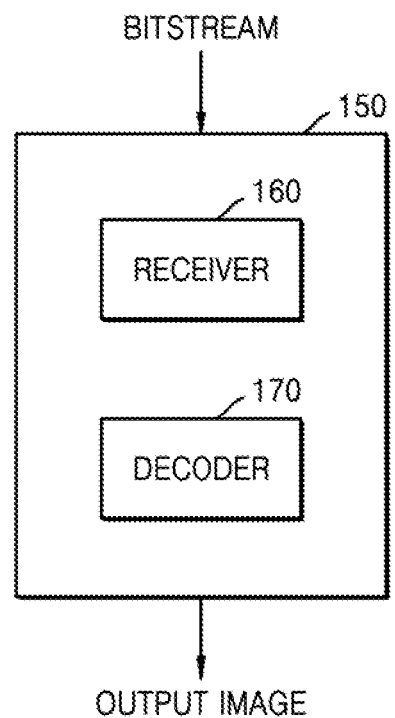
FIG. 1B is a block diagram of an image decoding device based on coding units according to a tree-structure, according to an embodiment.

FIG. 1B is a block diagram of an image decoding device 150 based on coding units according to the tree structure, according to an embodiment.

The image decoding device 150 includes a receiver 160 and a decoder 170.

Definitions of various terms such as a coding unit, a prediction unit, a transform unit, various types of split information for a decoding operation of the image decoding device 150 according to an embodiment are the same as described above with reference to FIG. 1 and the image encoding device 100. In addition, as the purpose of the image decoding device 150 is to reconstruct the image data, various encoding method used in the image encoding device 100 may be applied to the image decoding device 150.

The receiver 160 receives and parses a bitstream for the encoded video. The decoder 170 extracts, from the parsed bitstream, information required for decoding for each largest coding unit and provides the information to the decoder 170. The decoder 170 may extract information regarding a largest size of a coding unit of the current picture from a header, a sequence parameter set, or a picture parameter set regarding the current picture.

In addition, the decoder 170 extracts split information for coding units according to the tree structure for each largest coding unit, from the parsed bitstream. The extracted split information is output to the decoder 170. The decoder 170 may determine the tree structure of the largest coding unit by splitting the largest coding unit according to the extracted split information.

The split information extracted by the decoder 170 is split information regarding the tree structure determined to be a structure in which a smallest encoding error occurs by the image encoding device 100. Therefore, the image decoding device 150 may reconstruct the image by decoding the data according to an encoding method by which the smallest encoding error occurs.

The decoder 170 may extract split information regarding the data unit such as the prediction unit and the transform unit included in the coding unit. For example, the decoder 170 may extract information regarding a most efficient partition mode for the prediction unit. In addition, the decoder 170 may extract transform split information regarding a most efficient tree structure for the transform unit.

Furthermore, the decoder 170 may obtain information regarding a most efficient prediction method for the prediction units split from the coding unit. In addition, the decoder 170 may obtain information regarding a most efficient transform method for the transform units split from the coding unit.

The decoder 170 extracts information from the bitstream according to a way of constructing the bitstream by the bitstream generator 120 of the image encoding device 100.

The decoder 170 may split the largest coding unit into coding units having a most efficient tree structure, based on the split information. In addition, the decoder 170 may split the coding unit into prediction units, according to information regarding the partition mode. The decoder 170 may split the coding unit into transform units according to the transform split information.

The decoder 170 may predict the prediction unit according to the information regarding the prediction method. The decoder 170 may perform inverse-quantization and inverse-transform on the residual data, which corresponds to the difference between the original value and the predicted value of a pixel, according to the information regarding method of transforming the transform unit. In addition, the decoder 170 may reconstruct pixels in the coding unit according to the prediction result of the prediction unit and the transform result of the transform unit.

Figure 2:
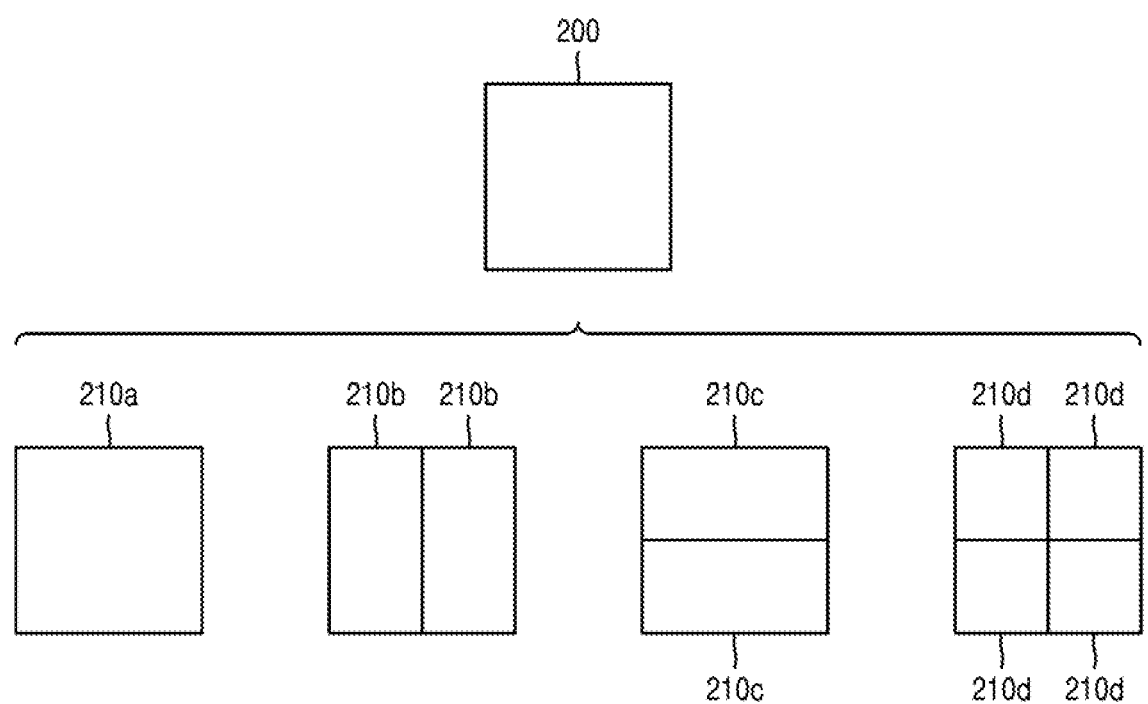
FIG. 2 illustrates a process of determining at least one coding unit by splitting a current coding unit, according to an embodiment.

FIG. 2 illustrates a process, performed by an image decoding device 150, of determining at least one coding unit by splitting a current coding unit, according to an embodiment.

According to an embodiment, the image decoding device 150 may determine a shape of a coding unit by using block shape information, and may determine a splitting method of the coding unit by using split shape information. That is, a coding unit splitting method indicated by the split shape information may be determined based on a block shape indicated by the block shape information used by the image decoding device 150.

According to an embodiment, the image decoding device 150 may use the block shape information indicating that the current coding unit has a square shape. For example, the image decoding device 150 may determine whether not to split a square coding unit, whether to vertically split the square coding unit, whether to horizontally split the square coding unit, or whether to split the square coding unit into four coding units, based on the split shape information. Referring to FIG. 2, when the block shape information of a current coding unit 200 indicates a square shape, a decoder 170 may determine that a coding unit 201a having the same size as the current coding unit 200 is not split, based on the split shape information indicating not to perform splitting, or may determine coding units 210b, 210c, and 210d split based on the split shape information indicating a preset splitting method.

Referring to FIG. 2, according to an embodiment, the image decoding device 150 may determine two coding units 210b obtained by splitting the current coding unit 200 in a vertical direction, based on the split shape information indicating to perform splitting in a vertical direction. The image decoding device 150 may determine two coding units 210c obtained by splitting the current coding unit 200 in a horizontal direction, The image decoding device 150 may determine four coding units 210d obtained by splitting the current coding unit 200 in vertical and horizontal directions, based on the split shape information indicating to perform splitting in vertical and horizontal directions. However, splitting methods of the square coding units are not limited to the above-described methods, and the split shape information may indicate various methods. Preset splitting methods of splitting the square coding unit will be described in detail below in relation to various embodiments.

Figure 3:
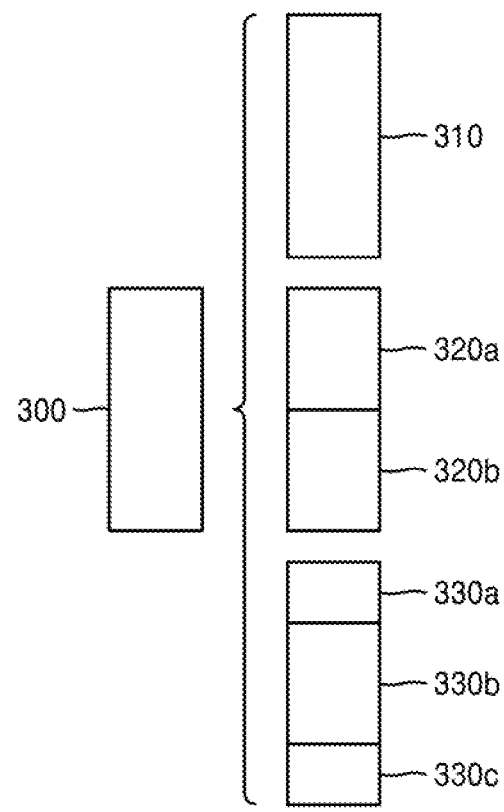
FIG. 3 illustrates a process of determining at least one coding unit by splitting a non-square coding unit, according to an embodiment.
Figure 3:
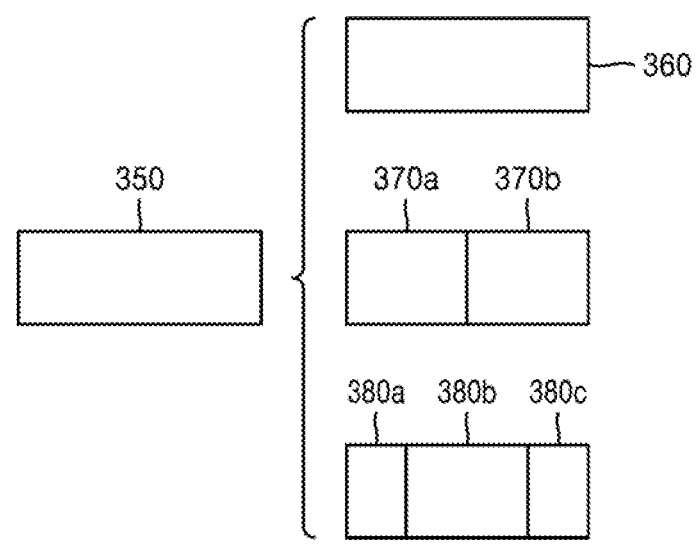

FIG. 3 illustrates a process, performed by the image decoding device 150, of determining at least one coding unit by splitting a non-square coding unit, according to an embodiment.

According to an embodiment, when the image decoding device 150 may use block shape information indicating that a current coding unit has a non-square shape. The image decoding device 150 may determine whether not to split the non-square current coding unit or whether to split the non-square current coding unit by using a preset splitting method, based on the split shape information. Referring to FIG. 3, when the block shape information of a current coding unit 300 or 350 indicates a non-square shape, the image decoding device 150 may determine that a coding unit 310 or 360 having the same size as the current coding unit 300 or 350 is not split, based on the split shape information indicating not to perform split, or determine coding units 320a and 320b, 330a to 330c, 370a and 370b, or 380a to 380c split based on the split shape information indicating a preset splitting method. Preset splitting methods of splitting a non-square coding unit will be described in detail below in relation to various embodiments.

According to an embodiment, the image decoding device 150 may determine a splitting method of a coding unit by using the split shape information and, in this case, the split shape information may indicate the number of one or more coding units generated by splitting a coding unit. Referring to FIG. 3, when the split shape information indicates to split the current coding unit 300 or 350 into two coding units, the image decoding device 150 may determine two coding units 320a and 320b, or 370a and 370b included in the current coding unit 300 or 350, by splitting the current coding unit 300 or 350 based on the split shape information.

According to an embodiment, when the image decoding device 150 splits the non-square current coding unit 300 or 350 based on the split shape information, the location of a long side of the non-square current encoding unit 300 or 350 may be considered. For example, the image decoding device 150 may determine a plurality of coding units by dividing the long side of the current coding unit 300 or 350, in consideration of the shape of the current coding unit 300 or 350.

According to an embodiment, when the split shape information indicates to split a coding unit into an odd number of blocks, the image decoding device 150 may determine an odd number of coding units included in the current coding unit 300 or 350. For example, when the split shape information indicates to split the current coding unit 300 or 350 into three coding units, the image decoding device 150 may split the current coding unit 300 or 350 into three coding units 330*a*, 330*b*, and 330*c*, or 380*a*, 380*b*, and 380*c*. According to an embodiment, the image decoding device 150 may determine an odd number of coding units included in the current coding unit 300 or 350, and not all the determined coding units may have the same size. For example, a preset coding unit 330*b* or 380*b* from among the determined odd number of coding units 330*a*, 330*b*, and 33*c*0, or 380*a*, 380*b*, and 380*c* may have a size different from the size of the other coding units 330*a* and 330*c*, or 380*a* and 380*c*. That is, coding units which may be determined by splitting the current coding unit 300 or 350 may have multiple sizes.

According to an embodiment, when the split shape information indicates to split a coding unit into an odd number of blocks, the image decoding device 150 may determine an odd number of coding units included in the current coding unit 300 or 350, and may put a preset restriction on at least one coding unit from among the odd number of coding units generated by splitting the current coding unit 300 or 350. Referring to FIG. 3, the image decoding device 150 may allow a decoding method of the coding unit 330*b* or 380*b* to be different from that of the other coding units 330*a* and 330*c*, or 380*a* and 380*c*, wherein the coding unit 330*b* or 380*b* is at a center location from among the three coding units 330*a*, 330*b*, and 330*c*, or 380*a*, 380*b*, and 380*c* generated by splitting the current coding unit 300 or 350. For example, the image decoding device 150 may restrict the coding unit 330*b* or 380*b* at the center location to be no longer split or to be split only a preset number of times, unlike the other coding units 330*a* and 330*c*, or 380*a* and 380*c*.

Figure 4:
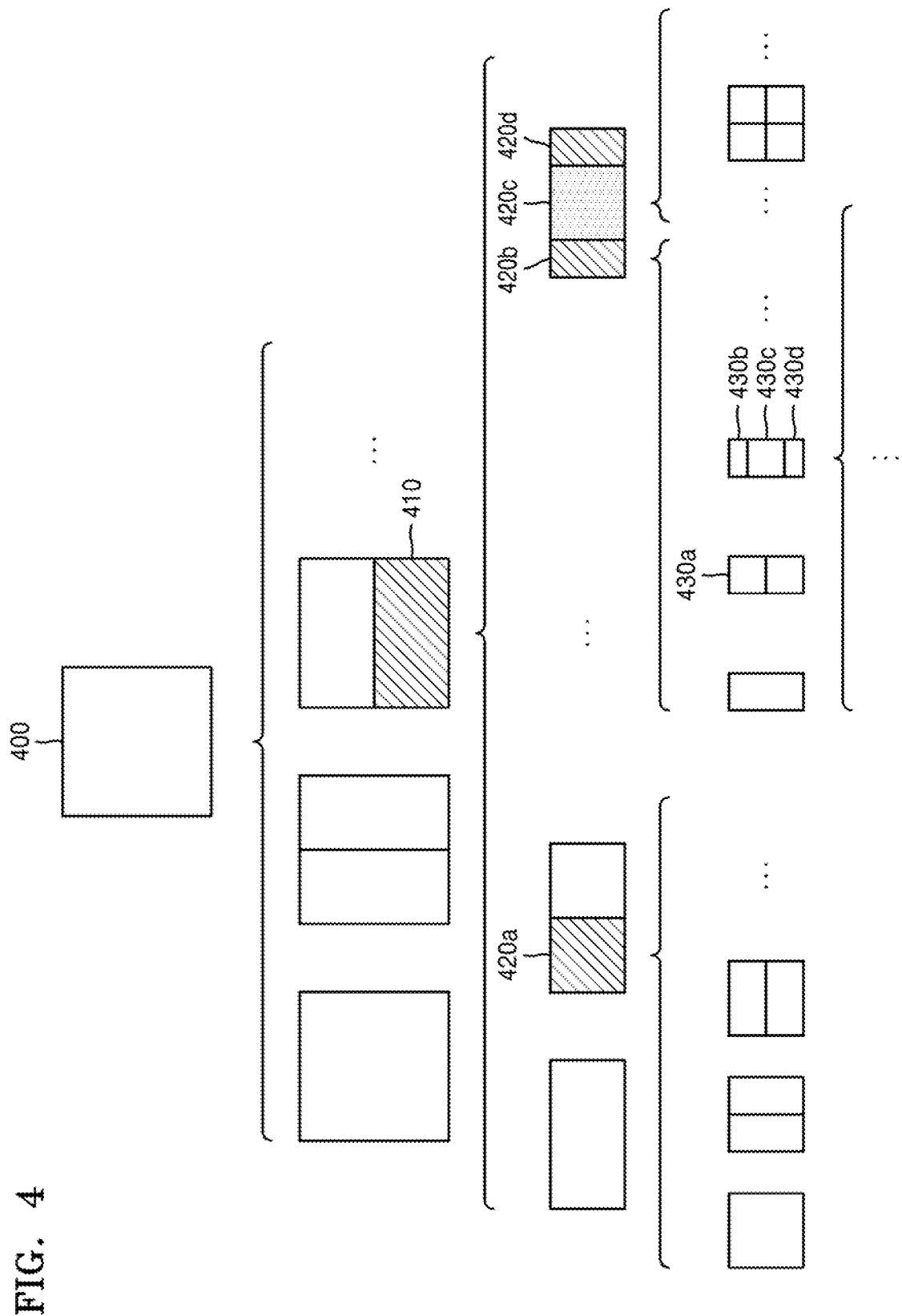
FIG. 4 illustrates a process of splitting a coding unit based on at least one of block shape information and split shape information, according to an embodiment.

FIG. 4 illustrates a process, performed by the image decoding device 150, of splitting a coding unit based on at least one of block shape information and split shape information, according to an embodiment.

According to an embodiment, the image decoding device 150 may determine to split or not to split a square first coding unit 400 into coding units, based on at least one of the block shape information and the split shape information. According to an embodiment, when the split shape information indicates to split the first coding unit 400 in a horizontal direction, the image decoding device 150 may determine a second coding unit 410 by splitting the first coding unit 400 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above description.

According to an embodiment, the image decoding device 150 may determine to split or not to split the determined second coding unit 410 into coding units, based on at least one of the block shape information and the split shape information. Referring to FIG. 4, the image decoding device 150 may split the non-square second coding unit 410, which is determined by splitting the first coding unit 400, into one or more third coding units 420*a*, 420*b*, 420*c*, and 420*d* based on at least one of the block shape information and the split shape information, or may not split the non-square second coding unit 410. The image decoding device 150 may obtain at least one of the block shape information and the split shape information, and determine a plurality of various-shaped second coding units (e.g., 410) by splitting the first coding unit 400, based on the obtained at least one of the block shape information and the split shape information, and the second coding unit 1210 may be split by using the splitting method of the first coding unit 400, based on at least one of the block shape information and the split shape information. According to an embodiment, when the first coding unit 400 is split into the second coding units 410 based on at least one of the block shape information and the split shape information of the first coding unit 400, the second coding unit 410 may also be split into the third coding units 420*a*, or 420*b*, 420*c*, and 420*d* based on at least one of the block shape information and the split shape information of the second coding unit 410. That is, a coding unit may be recursively split based on at least one of the block shape information and the split shape information of each coding unit. A method that may be used recursively split a coding unit will be described below in detail with reference to various embodiments.

According to an embodiment, the image decoding device 150 may determine to split each of the third coding units 420*a*, or 420*b*, 420*c*, and 420*d* into coding units or not to split the second coding unit 410, based on at least one of the block shape information and the split shape information. According to an embodiment, the image decoding device 150 may split the non-square second coding unit 410 into an odd number of third coding units 420*b*, 420*c*, and 420*d*. The image decoding device 150 may put a preset restriction on a preset third coding unit from among the odd number of third coding units 420*b*, 420*c*, and 420*d*. For example, the image decoding device 150 may restrict the third coding unit 420*c* at a center location from among the odd number of third coding units 420*b*, 420*c*, and 420*d* to be no longer split or to be split a settable number of times. Referring to FIG. 4, the image decoding device 150 may restrict the third coding unit 420*c*, which is at the center location from among the odd number of third coding units 420*b*, 420*c*, and 420*d* included in the non-square second coding unit 410, to be no longer split, to be split by using a preset splitting method (e.g., split into only four coding units or split by using a splitting method of the second coding unit 410), or to be split only a preset number of times (e.g., split only n times (wherein n>0)). However, the restrictions on the third coding unit 420*c* at the center location are not limited to the above-described examples, and it should be interpreted that the restrictions may include various restrictions for decoding the third coding unit 420*c* at the center location differently from the other third coding units 420*b* and 420*d*.

According to an embodiment, the image decoding device 150 may obtain at least one of the block shape information and the split shape information, which is used to split a current coding unit, from a preset location in the current coding unit.

According to an embodiment, when the current coding unit is split into a preset number of coding units, the image decoding device 150 may select one of the coding units.

Various methods may be used to select one of a plurality of coding units, as will be described below in relation to various embodiments.

According to an embodiment, the image decoding device 150 may split the current coding unit into a plurality of coding units, and may determine a coding unit at a preset location.

Figure 5:
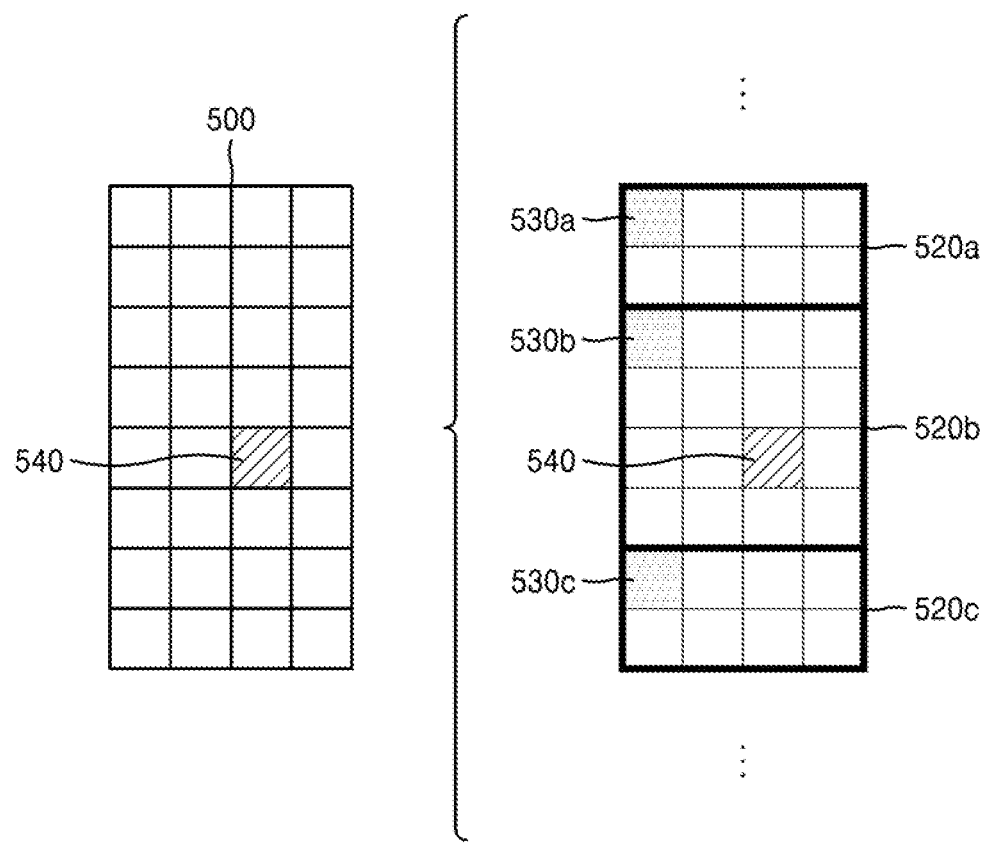
FIG. 5 illustrates a method of determining a preset coding unit from among an odd number of coding units, according to an embodiment.

FIG. 5 illustrates a method, performed by the image decoding device 150, of determining a coding unit of a preset location from among an odd number of coding units, according to an embodiment.

According to an embodiment, the image decoding device 150 may use the information indicating locations of the odd number of coding units, to determine a coding unit at a center location from among the odd number of coding units. Referring to FIG. 5, the image decoding device 150 may determine an odd number of coding units 520a, 520b, and 520c by splitting a current coding unit 500. The image decoding device 150 may determine a coding unit 520b at a center location by using information about locations of the odd number of coding units 520a to 520c. For example, the image decoding device 150 may determine the coding unit 520b of the center location by determining the locations of the coding units 520a, 520b, and 520b based on information indicating locations of preset samples included in the coding units 520a, 520b, and 520c. In detail, the image decoding device 150 may determine the coding unit 520b at the center location by determining the locations of the coding units 520a, 520b, and 520c based on information indicating locations of top left samples 530a, 530b, and 530c of the coding units 520a, 520b, and 520c.

According to an embodiment, the information indicating the locations of the top left samples 530a, 530b, and 530c, which are included in the coding units 520a, 520b, and 520c, respectively, may include information about locations or coordinates of the coding units 520a, 520b, and 520c in a picture. According to an embodiment, the information indicating the locations of the top left samples 530a, 530b, and 530c, which are included in the coding units 520a, 520b, and 520b, respectively, may include information indicating widths or heights of the coding units 520a, 520b, and 520c included in the current coding unit 500, and the widths or heights may correspond to information indicating references between the coordinates of the coding units 520a, 520b, and 520c in the picture. That is, the image decoding device 150 may determine the coding unit 520b at the center location by directly using the information about the locations or coordinates of the coding units 520a, 520b, and 520c in the picture, or by using the information about the widths or heights of the coding units, which correspond to the difference values between the coordinates.

According to an embodiment, information indicating the location of the top left samples 530a of an upper coding unit 520a may include coordinates (xa, ya), information indicating the location of the top left sample 530b of a middle coding unit 520b may include coordinates (xb, yb), and information indicating the location of the top left sample 530b of a lower coding unit 520c may include coordinates (xc, yc). The image decoding device 150 may determine the middle coding unit 520b by using the coordinates of the top left samples 530a, 530b, and 530c which are included in the coding units 520a, 520b, and 520c, respectively. For example, when the coordinates of the top left samples 530a, 530b, and 530c are sorted in an ascending or descending order, the coding unit 520b including the coordinates (xb, yb) of the sample 530b at a center location from among the coding units 520a, 520b, and 520c determined by splitting the current coding unit 500. However, the coordinates indicating the locations of the top left samples 530a, 530b, and 530c may indicate coordinates indicating absolute locations in the picture, or may use coordinates (dxb, dyb) indicating a relative location of the top left sample 530b of the middle coding unit 520b and coordinates (dxc, dyc) indicating a relative location of the top left sample 530c of the lower coding unit 520c with reference to the location of the top left sample 530a of the upper coding unit 520a. A method of determining a coding unit at a preset location by using coordinates of sample included in the coding unit, as information indicating a location of the sample, is not limited to the above-described methods, and may include various arithmetic methods capable of using the coordinates of the sample.

According to an embodiment, the image decoding device 150 may split the current coding unit 500 into a plurality of coding units 520a, 520b, and 520c, and may select one of the coding units 520a, 520b, and 520c based on a preset criterion. For example, the image decoding device 150 may select the coding unit 520b, which has a size different from that of others, from among the coding units 520a, 520b, and 520c.

According to an embodiment, the image decoding device 150 may determine the widths or heights of the coding units 520a, 520b, and 520c by using the coordinates (xa, ya) indicating the location of the top left sample 530a of the upper coding unit 520a, the coordinates (xb, yb) indicating the location of the top left sample 530b of the middle coding unit 520b, and the coordinates (xc, yc) indicating the location of the top left sample 530c of the lower coding unit 520c. The image decoding device 150 may determine the respective sizes of the coding units 520a, 520b, and 520c by using the coordinates (xa, ya), (xb, yb), and (xc, yc) indicating the locations of the coding units 520a, 520b, and 520c.

According to an embodiment, the image decoding device 150 may determine the width of the middle coding unit 520b to be xb-xa and determine the height thereof to be yb-ya. According to an embodiment, the image decoding device 150 may determine the width of the middle coding unit 520b to be xc-xb and determine the height thereof to be yc-yb. According to an embodiment, the image decoding device 150 may determine the width or height of the lower coding unit 520c by using the width or height of the current coding unit 500 or the widths or heights of the upper and middle coding units 520a and 520b. The image decoding device 150 may determine a coding unit, which has a size different from that of the others, based on the determined widths and heights of the coding units 520a to 520c. Referring to FIG. 5, the image decoding device 150 may determine the middle coding unit 520b, which has a size different from the size of the upper and lower coding units 520a and 520c, as the coding unit of the preset location. However, the above-described method, performed by the image decoding device 150, of determining a coding unit having a size different from the size of the other coding units merely corresponds to an example of determining a coding unit at a present location by using the sizes of coding units, which are determined based on coordinates of samples, and thus various methods of determining a coding unit at a preset location by comparing the sizes of coding units, which are determined based on coordinates of preset samples, may be used.

However, locations of samples considered to determine locations of coding units are not limited to the above-described top left locations, and information about arbitrary locations of samples included in the coding units may be used.

According to an embodiment, the image decoding device 150 may select a coding unit at a present location from among an odd number of coding units determined by splitting the current coding unit, considering the shape of the current coding unit. For example, when the current coding unit has a non-square shape, a width of which is longer than a height, the video decoding device 150 may determine the coding unit at a preset location in a horizontal direction. That is, the image decoding device 150 may determine one of coding units at different locations in a horizontal direction and put a restriction on the coding unit. When the current coding unit has a non-square shape, a height of which is longer than a width, the image decoding device 150 may determine the coding unit at the preset location in a vertical direction. That is, the image decoding device 150 may determine one of coding units at different locations in a vertical direction and may put a restriction on the coding unit.

According to an embodiment, the image decoding device 150 may use information indicating respective locations of an even number of coding units, to determine the coding unit at the preset location from among the even number of coding units. The image decoding device 150 may determine an even number of coding units by splitting the current coding unit, and may determine the coding unit at the preset location by using the information about the locations of the even number of coding units. An operation related thereto may correspond to the operation of determining a coding unit at a preset location (e.g., a center location) from among an odd number of coding units, which has been described above in detail in relation to FIG. 5, and thus detailed descriptions thereof are not provided here.

According to an embodiment, when a non-square current coding unit is split into a plurality of coding units, preset information about a coding unit at a preset location may be used in a splitting operation to determine the coding unit at the preset location from among the plurality of coding units. For example, the image decoding device 150 may use at least one of block shape information and split shape information, which is stored in a sample included in a coding unit at a center location, in a splitting operation to determine the coding unit at the center location from among the plurality of coding units determined by splitting the current coding unit.

Referring to FIG. 5, the image decoding device 150 may split the current coding unit 500 into the plurality of coding units 520*a*, 520*b*, and 520*c*, and may determine the coding unit 520*b* at the center location from among the plurality of coding units 520*a*, 520*b*, and 520*c*. Furthermore, the image decoding device 150 may determine the coding unit 520*b* at the center location, in consideration of a location from which at least one of the block shape information and the split shape information is obtained. That is, at least one of the block shape information and the split shape information of the current coding unit 500 may be obtained from a sample 540 at a center location of the current coding unit 500 and, when the current coding unit 500 is split into the plurality of coding units 520*a*, 520*b*, and 520*c* based on at least one of the block shape information and the split shape information, the coding unit 520*b* including the sample 540 may be determined as the coding unit at the center location. However, information used to determine the coding unit at the center location is not limited to at least one of the block shape information and the split shape information, and various types of information may be used to determine the coding unit at the center location.

According to an embodiment, preset information for identifying the coding unit at the preset location may be obtained from a preset sample included in a coding unit to be determined. Referring to FIG. 5, the image decoding device 150 may use at least one of the block shape information and the split shape information, which is obtained from a sample at a preset location in the current coding unit 500 (e.g., a sample at a center location of the current coding unit) to determine a coding unit at a preset location from among the plurality of the coding units 520*a*, 520*b*, and 520*c* determined by splitting the current coding unit 500 (e.g., a coding unit at a center location from among the plurality of split coding units). That is, the image decoding device 150 may determine the sample at the preset location by considering a block shape of the current coding unit 500, determine the coding unit 520*b* including a sample, from which preset information (e.g., at least one of the block shape information and the split shape information) may be obtained, from among the plurality of coding units 520*a*, 520*b*, and 520*c* determined by splitting the current coding unit 500, and may put a preset restriction on the coding unit 520*b*. Referring to FIG. 5, according to an embodiment, the image decoding device 150 may determine the sample 540 at the center location of the current coding unit 500 as the sample from which the preset information may be obtained, and may put a preset restriction on the coding unit 520*b* including the sample 520, in a decoding operation. However, the location of the sample from which the preset information may be obtained is not limited to the above-described location, and may include arbitrary locations of samples included in the coding unit 520*b* to be determined for a restriction.

According to an embodiment, the location of the sample from which the preset information may be obtained may be determined based on the shape of the current coding unit 500. According to an embodiment, the block shape information may indicate whether the current coding unit has a square or non-square shape, and the location of the sample from which the preset information may be obtained may be determined based on the shape. For example, the image decoding device 150 may determine a sample located on a boundary for dividing at least one of a width and height of the current coding unit in half, as the sample from which the preset information may be obtained, by using at least one of information about the width of the current coding unit and information about the height of the current coding unit. As another example, when the block shape information of the current coding unit indicates a non-square shape, the image decoding device 150 may determine one of samples adjacent to a boundary for dividing a long side of the current coding unit in half, as the sample from which the preset information may be obtained.

According to an embodiment, when the current coding unit is split into a plurality of coding units, the image decoding device 150 may use at least one of the block shape information and the split shape information to determine a coding unit at a preset location from among the plurality of coding units. According to an embodiment, the image decoding device 150 may obtain at least one of the block shape information and the split shape information from a sample at a preset location in a coding unit, and may split a plurality of coding units, which are generated by splitting the current coding unit, by using at least one of the split shape information and the block shape information, which is obtained from the sample at the preset location in each of the plurality of coding units. That is, a coding unit may be recursively split based on at least one of the block shape information and the split shape information, which is obtained from the sample at the preset location in each coding unit. An operation of recursively splitting a coding unit has been described above in relation to FIG. 4, and thus detailed descriptions thereof will not be provided here.

According to an embodiment, the image decoding device 150 may determine one or more coding units by splitting the current coding units, and may determine an order of decoding the one or more coding units, based on a preset block (e.g., the current coding unit).

Figure 6:
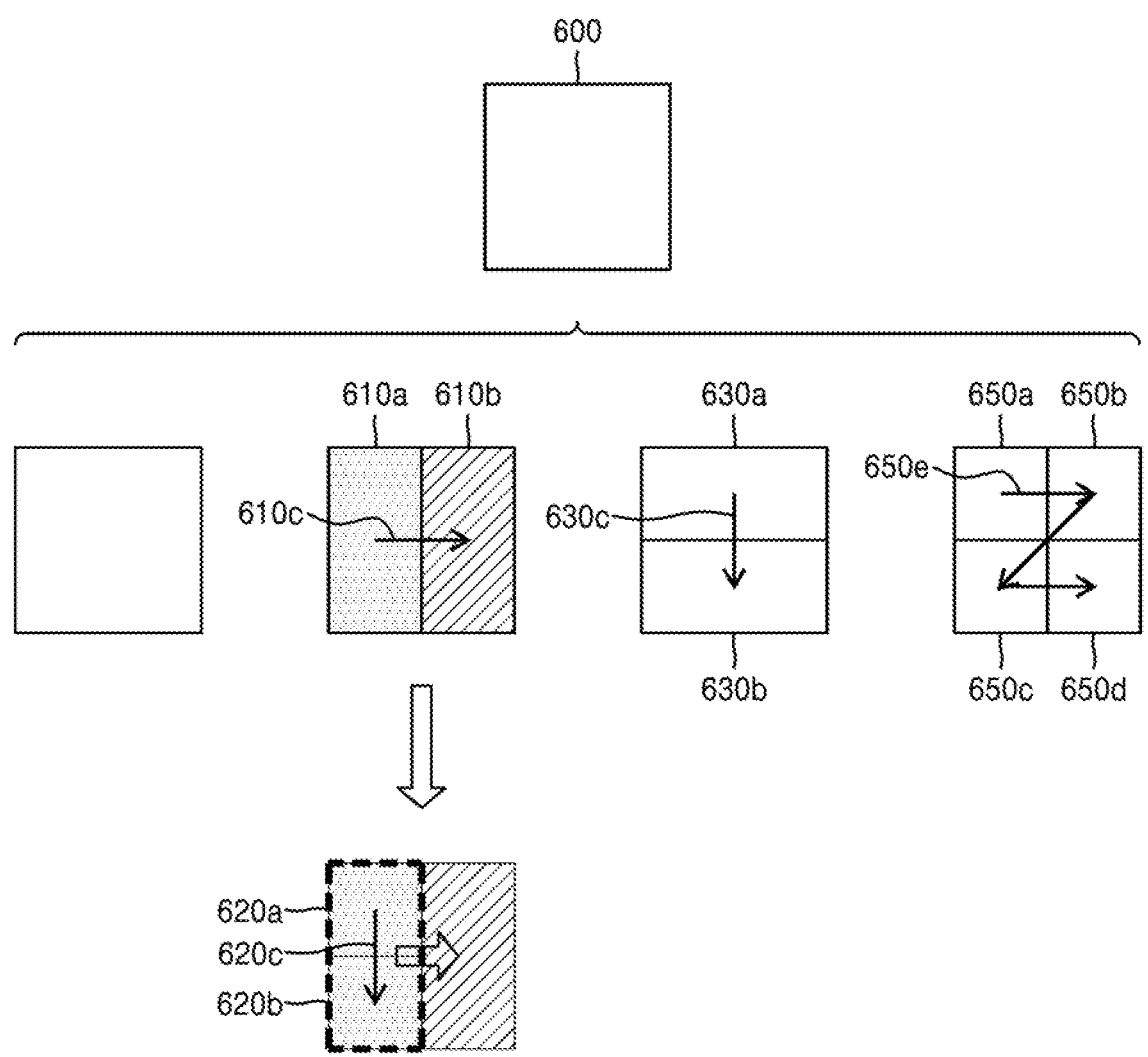
FIG. 6 illustrates an order of processing a plurality of coding units when the plurality of coding units are determined by splitting a current coding unit, according to an embodiment.

FIG. 6 illustrates an order of processing a plurality of coding units when the image decoding device 150 determines the plurality of coding units by splitting a current coding unit, according to an embodiment.

According to an embodiment, the image decoding device 150 may determine second coding units 610a and 610b by splitting a first coding unit 600 in a vertical direction, determine second coding units 630a and 630b by splitting the first coding unit 600 in a horizontal direction, or determine second coding units 650a to 650d by splitting the first coding unit 600 in vertical and horizontal directions, based on block shape information and split shape information.

Referring to FIG. 6, the image decoding device 150 may determine to process the second coding units 610a and 610b, which are determined by splitting the first coding unit 600 in a vertical direction, in a horizontal direction order 610c. The image decoding device 150 may determine to process the second coding units 630a and 630b, which are determined by splitting the first coding unit 600 in a horizontal direction, in a vertical direction order 630c. The image decoding device 150 may determine to process the second coding units 650a to 650d, which are determined by splitting the first coding unit 600 in vertical and horizontal directions, according to a preset order (e.g., a raster scan order or Z-scan order 650e) by which coding units in a row are processed and then coding units in a next row are processed.

According to an embodiment, the image decoding device 150 may recursively split coding units. Referring to FIG. 6, the image decoding device 150 may determine a plurality of coding units 610a, 610b, 630a, 630b, 650a, 650b, 650c, and 650d by splitting the first coding unit 600, and may recursively split each of the determined plurality of coding units 610a, 610b, 630a, 630b, 650a, 650b, 650c, and 650d. A splitting method of the plurality of coding units 610a, 610b, 630a, 630b, 650a, 650b, 650c, and 650d may correspond to a splitting method of the first coding unit 600. As such, each of the plurality of coding units 610a, 610b, 630a, 630b, 650a, 650b, 650c, and 650d may be independently split into a plurality of coding units. Referring to FIG. 6, the image decoding device 150 may determine the second coding units 610a and 610b by splitting the first coding unit 600 in a vertical direction, and may determine to independently split or not to split each of the second coding units 610a and 610b.

According to an embodiment, the image decoding device 150 may determine third coding units 620a and 620b by splitting the left second coding unit 610a in a horizontal direction, and may not split the right second coding unit 610b.

According to an embodiment, a processing order of coding units may be determined based on an operation of splitting a coding unit. In other words, a processing order of split coding units may be determined based on a processing order of coding units immediately before being split. The image decoding device 150 may determine a processing order of third coding units 620a and 620b determined by splitting the left second coding unit 610a, independently of the right second coding unit 610b. Because the third coding units 620a and 620b are determined by splitting the left second coding unit 610a in a horizontal direction, the third coding units 620a and 620b may be processed in a vertical direction order 620c. Because the left and right second coding units 610a and 610b are processed in the horizontal direction order 610c, the right second coding unit 610b may be processed after the third coding units 620a and 620b included in the left second coding unit 610a are processed in the vertical direction order 620c. An operation of determining a processing order of coding units based on a coding unit before being split is not limited to the above-described example, and various methods may be used to independently process coding units, which are split and determined into various shapes, in a preset order.

Figure 7:
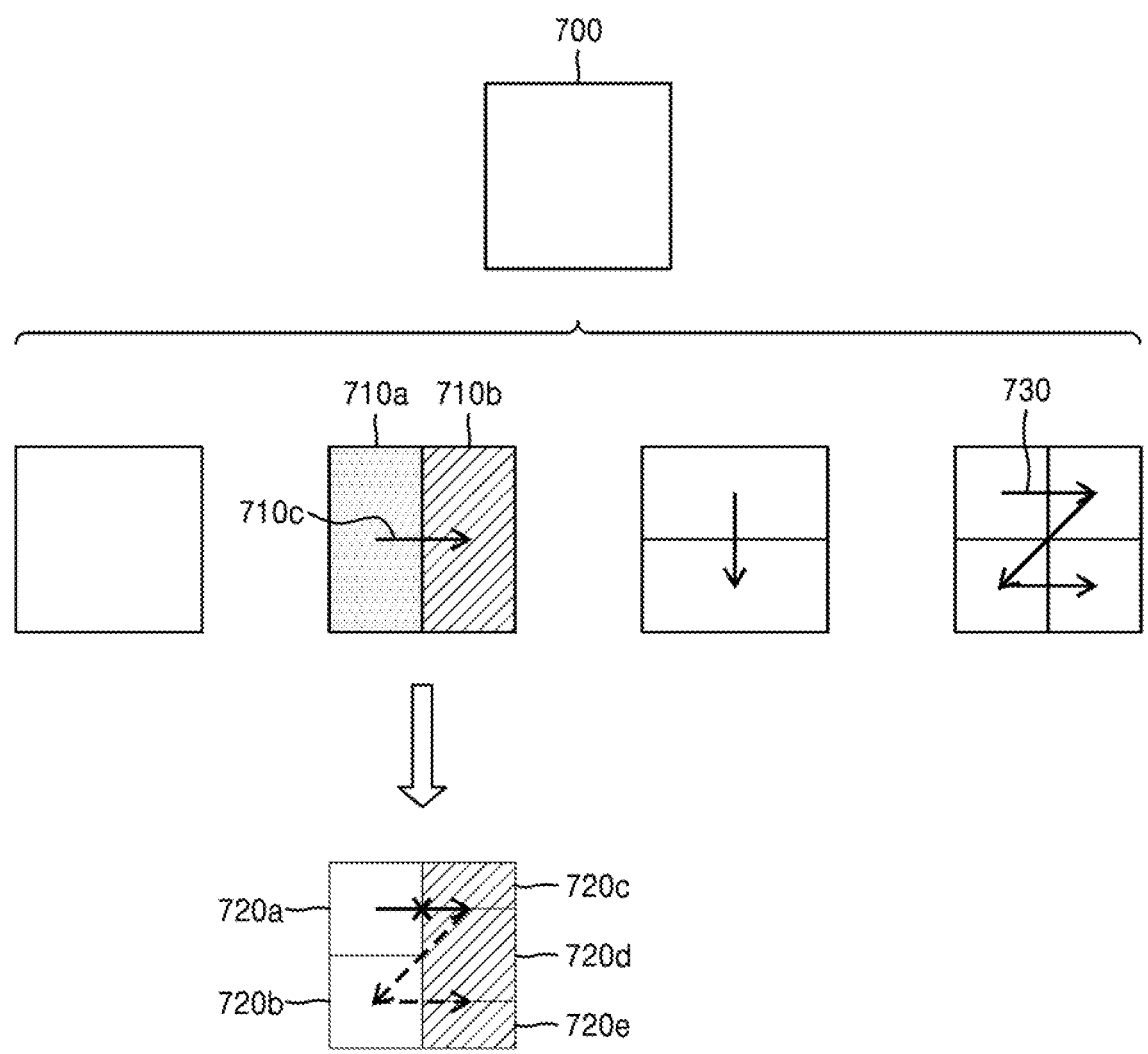
FIG. 7 illustrates a process of determining that a current coding unit is to be split into an odd number of coding units, when the coding units are not processable in a preset order, according to an embodiment.

FIG. 7 illustrates a process, performed by the image decoding device 150, of determining that a current coding unit is to be split into an odd number of coding units, when the coding units are not processable in a preset order, according to an embodiment.

According to an embodiment, the image decoding device 150 may determine that the current coding unit is to be split into an odd number of coding units, based on obtained block shape information and split shape information. Referring to FIG. 7, a square first coding unit 700 may be split into non-square second coding units 710a and 710b, and the second coding units 710a and 710b may be independently split into third coding units 720a and 720b, and 720c to 720e. According to an embodiment, the image decoding device 150 may determine a plurality of third coding units 720a and 720b by splitting the left second coding unit 710a in a horizontal direction, and may split the right second coding unit 710b into an odd number of third coding units 720c to 720e.

According to an embodiment, the image decoding device 150 may determine whether there are an odd number of split coding units, by determining whether the third coding units 720a and 720b, and 720c to 720e are processable in a preset order. Referring to FIG. 7, the image decoding device 150 may determine the third coding units 720a, 720b, and 720c to 720e by recursively splitting the first coding unit 700. The image decoding device 150 may determine whether any of the first coding unit 700, the second coding units 710a and 710b, or the third coding units 720a and 720b, 720c to 720e is to be split into an odd number of coding units, based on at least one of the block shape information and the split shape information. For example, a second coding unit located in the right from among the second coding units 710a and 710b may be split into an odd number of third coding units 720c, 720d, and 720e. A processing order of a plurality of coding units included in the first coding unit 700 may be a preset order (e.g., a Z-scan order 730), and the image decoding device 150 may determine whether the third coding units 720c, 720d, and 720e, which are determined by splitting the right second coding unit 710b into an odd number of coding units, satisfy a condition for processing in the preset order.

According to an embodiment, the image decoding device 150 may determine whether the third coding units 720a and 720b, and 720c, 720d, and 720e included in the first coding unit 700 satisfy the condition for processing in the preset order, and the condition relates to whether at least one of a width and height of the second coding units 710a and 710b is to be divided in half along a boundary of the third coding units 720a and 720b, and 720c, 720d, and 720e. For example, the third coding units 720a and 720b determined by dividing the height of the non-square left second coding unit 710a in half satisfy the condition. However, because boundaries of the third coding units 720c, 720d, and 720e determined by splitting the right second coding unit 710b into three coding units do not divide the width or height of the right second coding unit 710b in half, it may be determined that the third coding units 720c, 720d, and 720e do not satisfy the condition. When the condition is not satisfied as described above, the image decoding device 150 may decide disconnection of a scan order, and determine that the right second coding unit 710b is to be split into an odd number of coding units, based on a result of the decision. According to an embodiment, when a coding unit is split into an odd number of coding units, the image decoding device 150 may put a preset restriction on a coding unit at a preset location among the split coding units. The restriction or the preset location has been described above in relation to various embodiments, and thus detailed descriptions thereof will not be provided here.

Figure 8:
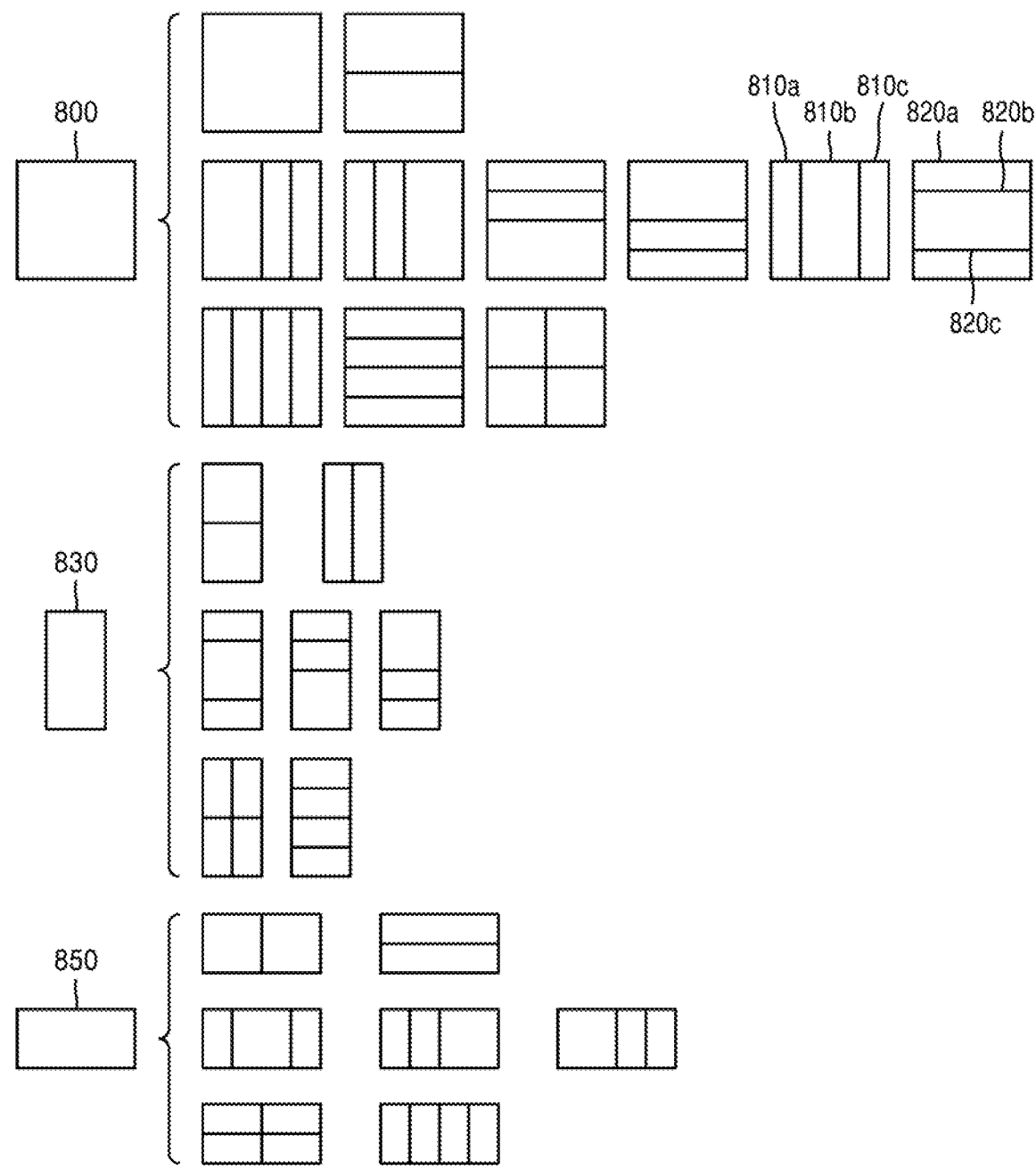
FIG. 8 illustrates a process of determining at least one coding unit by splitting a first coding unit, according to an embodiment.

FIG. 8 illustrates a process, performed by the image decoding device 150, of determining at least one coding unit by splitting a first coding unit 800. According to an embodiment, the image decoding device 100 may split the first coding unit 800, based on at least one of block shape information and split information, which is obtained by the obtainer 160. The square first coding unit 800 may be split into four square coding units, or may be split into a plurality of non-square coding units. For example, referring to FIG. 8, when the block shape information indicates that the first coding unit 800 has a square shape and the split shape information indicates to split the first coding unit 800 into non-square coding units, the image decoding device 150 may split the first coding unit 800 into a plurality of non-square coding units. In detail, when the split shape information indicates to determine an odd number of coding units by splitting the first coding unit 800 in a horizontal direction or a vertical direction, the image decoding device 150 may split the square first coding unit 800 into an odd number of coding units, e.g., second coding units 810a, 810b, and 810c determined by splitting the square first coding unit 800 in a vertical direction or second coding units 820a, 820b, and 820c determined by splitting the square first coding unit 800 in a horizontal direction.

According to an embodiment, the image decoding device 150 may determine whether the second coding units 810a, 810b, 810c, 820a, 820b, and 820c included in the first coding unit satisfy a condition for processing in a preset order, and the condition relates to whether at least one of a width and height of the first coding unit 800 is to be divided in half along a boundary of the second coding units 810a, 810b, 810c, 820a, 820b, and 820c. Referring to FIG. 8, because boundaries of the second coding units 810a, 810b, and 810c determined by splitting the square first coding unit 800 in a vertical direction do not divide the width of the first coding unit 800 in half, it may be determined that the first coding unit 800 does not satisfy the condition for processing in the preset order. In addition, because boundaries of the second coding units 820a, 820b, and 820c determined by splitting the square first coding unit 800 in a horizontal direction do not divide the width of the first coding unit 800 in half, it may be determined that the first coding unit 800 does not satisfy the condition for processing in the preset order. When the condition is not satisfied as described above, the image decoding device 150 may decide disconnection of a scan order, and may determine that the first coding unit 800 is to be split into an odd number of coding units, based on a result of the decision. According to an embodiment, when a coding unit is split into an odd number of coding units, the image decoding device 150 may put a preset restriction on a coding unit at a preset location among the split coding units. The restriction or the preset location has been described above in relation to various embodiments, and thus detailed descriptions thereof will not be provided here.

According to an embodiment, the image decoding device 150 may determine various-shaped coding units by splitting a first coding unit.

Referring to FIG. 8, the image decoding device 150 may split the square first coding unit 800 or a non-square first coding unit 830 or 850 into various-shaped coding units.

Figure 9:
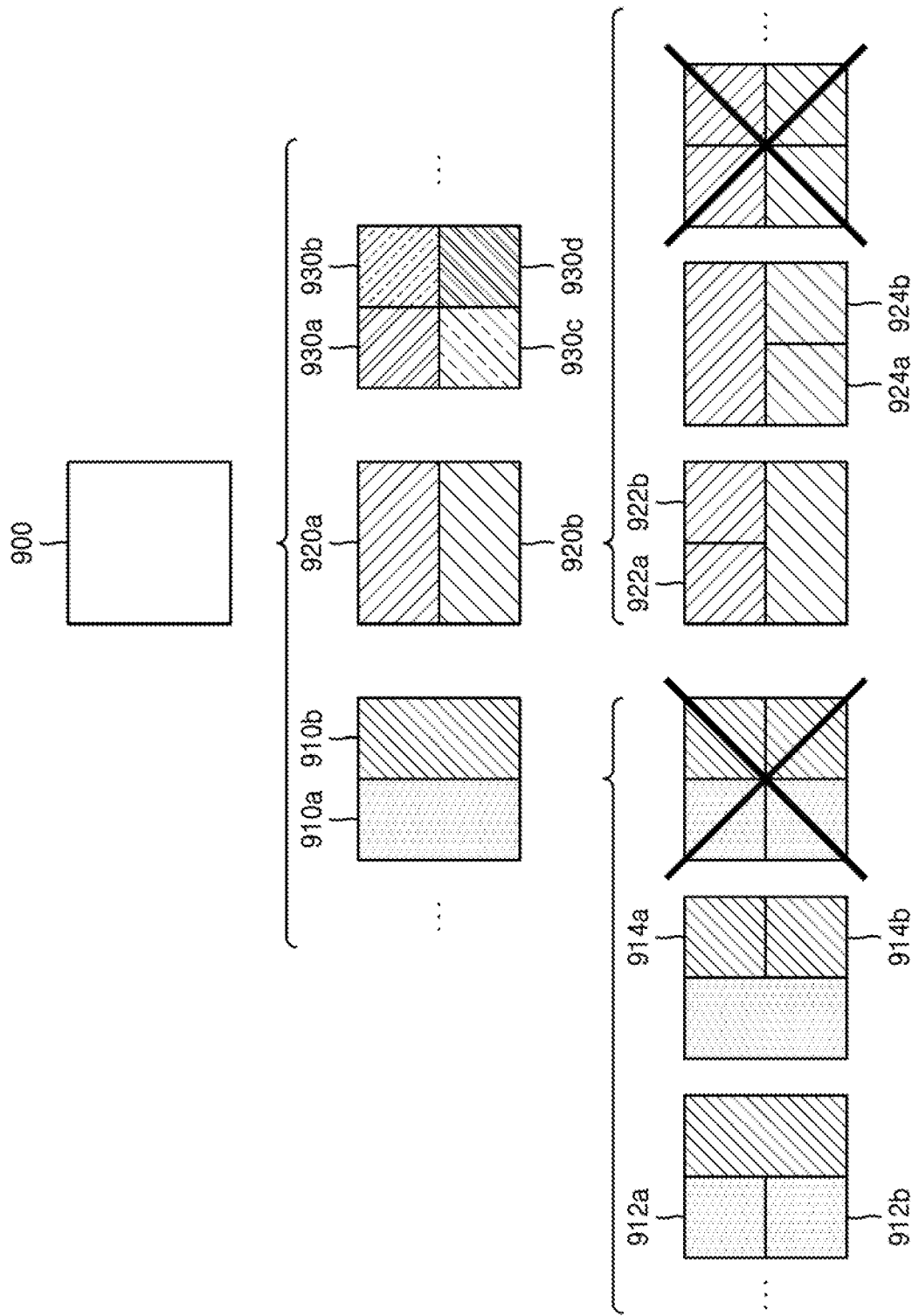
FIG. 9 illustrates that a shape into which a second coding unit is splittable is restricted when the second coding unit having a non-square shape, which is determined by splitting a first coding unit, satisfies a preset condition, according to an embodiment.

FIG. 9 illustrates that a shape into which a second coding unit is splittable by the image decoding device 150 is restricted when the second coding unit having a non-square shape, which is determined by splitting a first coding unit 900, satisfies a preset condition, according to an embodiment.

According to an embodiment, the image decoding device 150 may determine to split the square first coding unit 900 into non-square second coding units 910a, 910b, 920a, and 920b, based on at least one of block shape information and split shape information, which is obtained by the obtainer 160. The second coding units 910a, 910b, 920a, and 920b may be independently split. As such, the image decoding device 150 may determine to split or not to split the first coding unit 900 into a plurality of coding units, based on at least one of the block shape information and the split shape information of each of the second coding units 910a, 910b, 920a, and 920b. According to an embodiment, the image decoding device 150 may determine third coding units 912a and 912b by splitting the non-square left second coding unit 910a, which is determined by splitting the first coding unit 900 in a vertical direction, in a horizontal direction. However, when the left second coding unit 910a is split in a horizontal direction, the image decoding device 150 may restrict the right second coding unit 910b to not be split in a horizontal direction in which the left second coding unit 910a is split. When third coding units 914a and 914b are determined by splitting the right second coding unit 910b in a same direction, because the left and right second coding units 910a and 910b are independently split in a horizontal direction, the third coding units 912a, 912b, 914b, and 914b may be determined. However, this case serves equally as a case in which the image decoding device 150 splits the first coding unit 900 into four square second coding units 930a, 930b, 930c, and 930d, based on at least one of the block shape information and the split shape information, and may be inefficient in terms of image decoding.

According to an embodiment, the image decoding device 150 may determine third coding units 922a, 922b, 924a, and 924b by splitting the non-square coding unit 920a or 920b, which is determined by splitting the first coding unit 900 in a horizontal direction, in a vertical direction. However, when a second coding unit (e.g., the upper second coding unit 920a) is split in a vertical direction, for the above-described reason, the image decoding device 150 may restrict the other second coding unit (e.g., the lower second coding unit 920b) to not be split in a vertical direction in which the upper second coding unit 920a is split.

Figure 10:
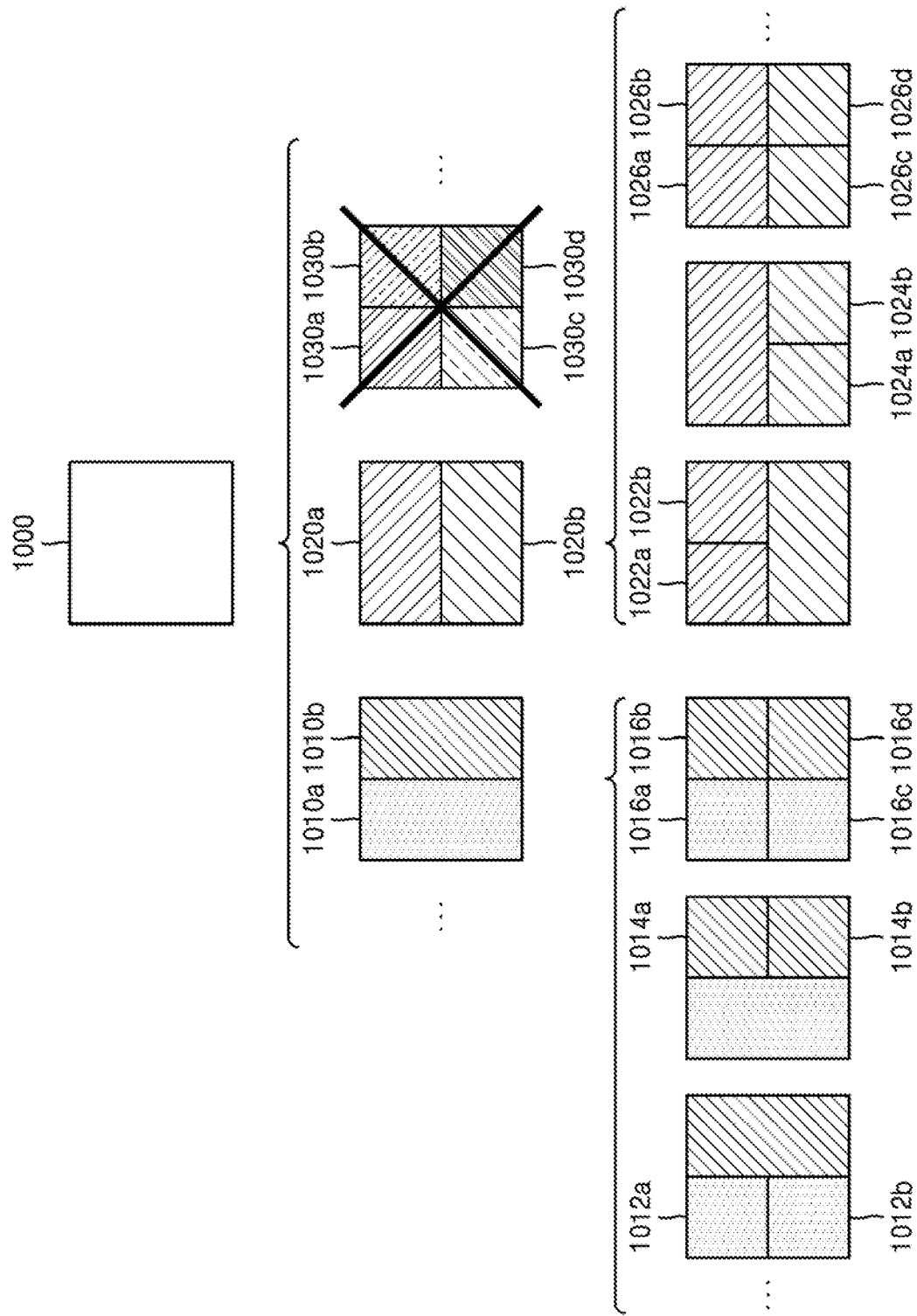
FIG. 10 illustrates a process of splitting a square coding unit when split shape information indicates that the square coding unit is not to be split into four square coding units, according to an embodiment.

FIG. 10 illustrates a process, performed by the image decoding device 150, of splitting a square coding unit when split shape information indicates that the square coding unit is not to be split into four square coding units, according to an embodiment.

According to an embodiment, the image decoding device 150 may determine second coding units 1010a, 1010b, 1020*a*, 1020*b*, etc. by splitting a first coding unit 1000, based on at least one of block shape information and split shape information. The split shape information may include information about various methods of splitting a coding unit, but the information about various splitting methods may not include information for splitting a coding unit into four square coding units. According to such split shape information, the image decoding device 150 may not split the first square coding unit 1000 into four square coding units 1030*a*, 1030*b*, 1030*c*, and 1030*d*. The image decoding device 150 may determine the non-square second coding units 1010*a*, 1010*b*, 1020*a*, 1020*b*, etc., based on the split shape information.

According to an embodiment, the image decoding device 150 may independently split the non-square second coding units 1010*a*, 1010*b*, 1020*a*, 1020*b*, etc. Each of the second coding units 1010*a*, 1010*b*, 1020*a*, 1020*b*, etc. may be recursively split in a preset order, and this splitting method may correspond to a method of splitting the first coding unit 1000, based on at least one of the block shape information and the split shape information.

For example, the image decoding device 150 may determine square third coding units 1012*a* and 1012*b* by splitting the left second coding unit 1010*a* in a horizontal direction, and may determine square third coding units 1014*a* and 1014*b* by splitting the right second coding unit 1010*b* in a horizontal direction. Furthermore, the image decoding device 150 may determine square third coding units 1016*a*, 1016*b*, 1016*c*, and 1016*d* by splitting both of the left and right second coding units 1010*a* and 1010*b* in a horizontal direction. In this case, coding units having the same shape as the four square second coding units 1030*a*, 1030*b*, 1030*c*, and 1030*d* split from the first coding unit 1000 may be determined.

As another example, the image decoding device 150 may determine square third coding units 1022*a* and 1022*b* by splitting the upper second coding unit 1020*a* in a vertical direction, and may determine square third coding units 1024*a* and 1024*b* by splitting the lower second coding unit 1020*b* in a vertical direction. Furthermore, the image decoding device 150 may determine square third coding units 1026*a*, 1026*b*, 1026*c*, and 1026*d* by splitting both of the upper and lower second coding units 1020*a* and 1020*b* in a vertical direction. In this case, coding units having the same shape as the four square second coding units 1030*a*, 1030*b*, 1030*c*, and 1030*d* split from the first coding unit 1000 may be determined.

Figure 11:
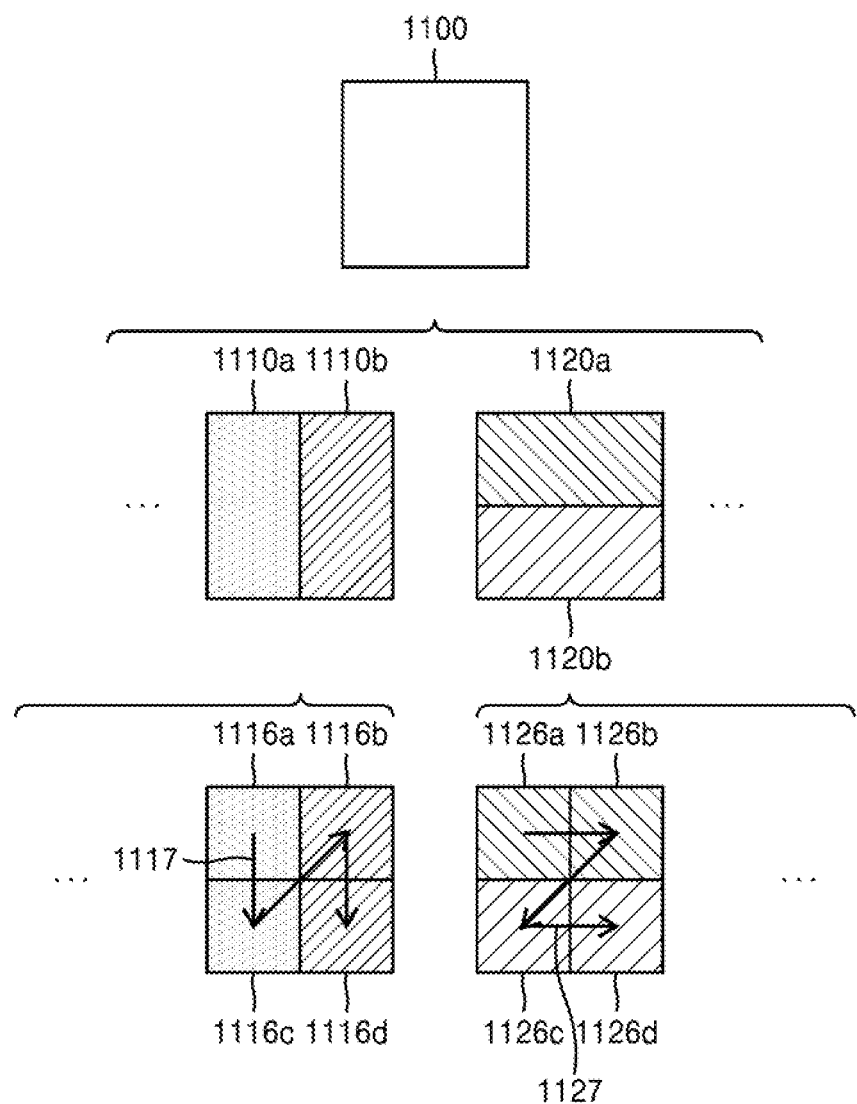
FIG. 11 illustrates that a processing order between a plurality of coding units may be changed depending on a process of splitting a coding unit, according to an embodiment.

FIG. 11 illustrates that a processing order between a plurality of coding units may be changed depending on a process of splitting a coding unit, according to an embodiment.

According to an embodiment, the image decoding device 150 may split a first coding unit 1100, based on block shape information and split shape information. When the block shape information indicates a square shape and the split shape information indicates to split the first coding unit 1100 in at least one of horizontal and vertical directions, the image decoding device 150 may determine second coding units 1110*a*, 1110*b*, 1120*a*, 1120*b* by splitting the first coding unit 1100. Referring to FIG. 11, the non-square second coding units 1110*a*, 1110*b*, 1120*a*, and 1120*b* determined by splitting the first coding unit 1100 in only a horizontal direction or vertical direction may be independently split based on the block shape information and the split shape information of each coding unit. For example, the image decoding device 150 may determine third coding units 1116*a*, 1116*b*, 1116*c*, and 1116*d* by splitting the second coding units 1110*a* and 1110*b*, which are generated by splitting the first coding unit 1100 in a vertical direction, in a horizontal direction, and may determine third coding units 1126*a*, 1126*b*, 1126*c*, and 1126*d* by splitting the second coding units 1120*a* and 1120*b*, which are generated by splitting the first coding unit 1100 in a horizontal direction, in a vertical direction. An operation of splitting the second coding units 1110*a*, 1110*b*, 1120*a*, and 1120*b* has been described above in relation to FIG. 9, and thus detailed descriptions thereof will not be provided herein.

According to an embodiment, the image decoding device 150 may process coding units in a preset order. An operation of processing coding units in a preset order has been described above in relation to FIG. 6, and thus detailed descriptions thereof will not be provided herein. Referring to FIG. 11, the image decoding device 150 may determine four square third coding units 1116*a*, 1116*b*, 1116*c*, 1116*d*, and 1926*a*, 1926*b*, 1926*c*, and 1926*d* by splitting the square first coding unit 1100. According to an embodiment, the image decoding device 150 may determine processing orders of the third coding units 1116*a*, 1116*b*, 1116*c*, and 1116*d*, and 1126*a*, 1126*b*, 1126*c*, and 1126*d* based on a splitting method of the first coding unit 1100.

According to an embodiment, the image decoding device 150 may determine the third coding units 1116*a*, 1116*b*, 1116*c*, and 1116*d* by splitting the second coding units 1110*a* and 1110*b* generated by splitting the first coding unit 1100 in a vertical direction, in a horizontal direction, and may process the third coding units 1116*a*, 1116*b*, 1116*c*, and 1116*d* in a processing order 1117 for initially processing the third coding units 1116*a* and 1116*c*, which are included in the second coding unit 1110*a*, in a vertical direction and then processing the third coding unit 1116*b* and 1116*d*, which are included in the right second coding unit 1110*b*, in a vertical direction.

According to an embodiment, the image decoding device 150 may determine the third coding units 1126*a*, 1126*b*, 1126*c*, and 1126*d* by splitting the second decoding units 1120*a* and 1120*b* generated by splitting the first coding unit 1100 in a horizontal direction, in a vertical direction, and may process the third coding units 1126*a*, 1126*b*, 1126*c*, and 1126*d* in a process order 1127 for initially processing the third coding units 1126 and 1126*b*, which are included in the upper second coding unit 1120*a*, in a horizontal direction and then processing the third coding units 1126*c* and 1126*d*, which are included in the lower second coding unit 1120*b*, in a horizontal direction.

Referring to FIG. 11, the square third coding units 1116*a*, 1116*b*, 1116*c*, and 1116*d*, and 1126*a*, 1126*b*, 1126*c*, and 1126*d* may be determined by splitting the second coding units 1110*a*, 1110*b*, 1120*a*, and 1120*b*, respectively. Although the second coding units 1110*a* and 1110*b* are determined by splitting the first coding unit 1100 in a vertical direction differently from the second coding units 1120*a* and 1120*b* which are determined by splitting the first coding unit 1100 in a horizontal direction, the third coding units 1116*a*, 1116*b*, 1116*c*, and 1116*d*, and 1126*a*, 1126*b*, 1126*c*, and 1126*d* split therefrom eventually show same-shaped coding units split from the first coding unit 1100. As such, by recursively splitting a coding unit in different manners based on at least one of the block shape information and the split shape information, the image decoding device 150 may process a plurality of coding units in different orders even when the coding units are eventually determined to be the same shape.

FIG. 12 illustrates a process of determining a depth of a coding unit as a shape and size of the coding unit change, when the coding unit is recursively split such that a plurality of coding units are determined, according to an embodiment.

According to an embodiment, the image decoding device 150 may determine the depth of the coding unit, based on a preset criterion. For example, the preset criterion may be the length of a long side of the coding unit. When the length of a long side of a coding unit before being split is 2n times (n>0) the length of a long side of a split current coding unit, the image decoding device 150 may determine that a depth of the current coding unit is increased from a depth of the coding unit before being split, by n. In the following description, a coding unit having an increased depth is expressed as a coding unit of a deeper depth.

Referring to FIG. 12, according to an embodiment, the image decoding device 150 may determine a second coding unit 1202 and a third coding unit 1204 of deeper depths by splitting a square first coding unit 1200 based on block shape information indicating a square shape (for example, the block shape information may be expressed as '0: SQUARE'). Assuming that the size of the square first coding unit 1200 is 2N×2N, the second coding unit 1202 determined by dividing a width and height of the first coding unit 1200 to $1/2^1$ may have a size of N×N. Furthermore, the third coding unit 1204 determined by dividing a width and height of the second coding unit 1202 to ½ may have a size of N/2×N/2. In this case, a width and height of the third coding unit 1204 are $1/2^2$ times those of the first coding unit 1200. When a depth of the first encoding 1200 is D, a depth of the second coding unit 1202, the width of height of which are $1/2^1$ times those of the first coding unit, may be D+1, and a depth of the third coding unit 1204, the width of which are $1/2^2$ times those of the first coding unit, may be D+2.

According to an embodiment, the image decoding device 150 may determine a second coding unit 1212 or 1222 and a third coding unit 1214 or 1224 of deeper depths by splitting a non-square first coding unit 1210 or 1220 based on block shape information indicating a non-square shape (for example, the block shape information may be expressed as 1:NS_VER' indicating a non-square shape, a height of which is longer than a width, or as '2:NS_HOR' indicating a non-square shape, a width of which is longer than a height).

The image decoding device 150 may determine a second coding unit 1202, 1212, or 1222 by dividing at least one of a width and height of the first coding unit 1210 having a size of N×2N. That is, the image decoding device 150 may determine the second coding unit 1202 having a size of N×N/or the second coding unit 1222 having a size of N×N/2 by splitting the first coding unit 1210 in a horizontal direction, or may determine the second coding unit 1212 having a size of N/2×N by splitting the first coding unit 1210 in horizontal and vertical directions.

According to an embodiment, the image decoding device 150 may determine the second coding unit 1202, 1212, or 1222 by dividing at least one of a width and height of the first coding unit 1220 having a size of 2N×N. That is, the image decoding device 150 may determine the second coding unit 1202 having a size of N×N or the second coding unit 1212 having the size of N/2×N by splitting the first coding unit 1220 in a vertical direction, or may determine the second coding unit 1222 having a size of N×N/2 by splitting the first coding unit 1220 in horizontal and vertical directions.

According to an embodiment, the image decoding device 150 may determine a third coding unit 1204, 1214, or 1224 by dividing at least one of a width and height of the second coding unit 1202 having a size of N×N. That is, the image decoding device 150 may determine the third coding unit 1204 having a size of N/2×N/2, the third coding unit 1214 having a size of N/2×N/2, or the third encoding 1224 having a size of N/2×N/2 by splitting the second coding unit 1202 in vertical and horizontal directions.

According to an embodiment, the image decoding device 150 may determine the third coding unit 1204, 1214, or 1224 by dividing at least one of a width and height of the second coding unit 1212 having a size of N/2×N. That is, the image decoding device 150 may determine the third coding unit 1204 having a size of N/2×N/2 or the third coding unit 1224 having a size of N/2×N/2 by splitting the second coding unit 1212 in a horizontal direction, or may determine the third coding unit 1214 having a size of N/2×N/2 by splitting the second coding unit 1212 in vertical and horizontal directions.

According to an embodiment, the image decoding device 150 may determine the third coding unit 1204, 1214, or 1224 by dividing at least one of a width and height of the second coding unit 1222 having a size of N×N/2. That is, the image decoding device 150 may determine the third coding unit 1204 having a size of N/2×N/2 or the third coding unit 1214 having a size of N/2×N/2 by splitting the second coding unit 1212 in a vertical direction, or may determine the third coding unit 1224 having a size of N/2×N/2 by splitting the second coding unit 1222 in vertical and horizontal directions.

According to an embodiment, the image decoding device 150 may split the square coding unit 1200, 1202, or 1204 in a horizontal or vertical direction. For example, the image decoding device 150 may determine the first coding unit 1210 having a size of N×2N by splitting the first coding unit 1200 having a size of 2N×2N in a vertical direction, or may determine the first coding unit 1220 having a size of 2N×N by splitting the first coding unit 1200 having a size of 2N×2N in a horizontal direction. According to an embodiment, when a depth is determined based on the length of a longest side of a coding unit, a depth of a coding unit determined by splitting the first coding unit 1200 having a size of 2N×2N in a horizontal or vertical direction may be the same as the depth of the first coding unit 1200, 1210, or 1220.

According to an embodiment, a width and height of the first coding unit 1214 or 1224 may be $½^2$ times those of the first coding unit 1210 or 1220. When a depth of the first coding unit 1210 or 1220 is D, a depth of the second coding unit 1212 or 1214, the width and height of which are ½ times those of the first coding unit 1210 or 1220, may be D+1, and a depth of the third coding unit 1214 or 1224, the width and height of which are $½^2$ times those of the first coding unit 1210 or 1220, may be D+2.

Figure 13:
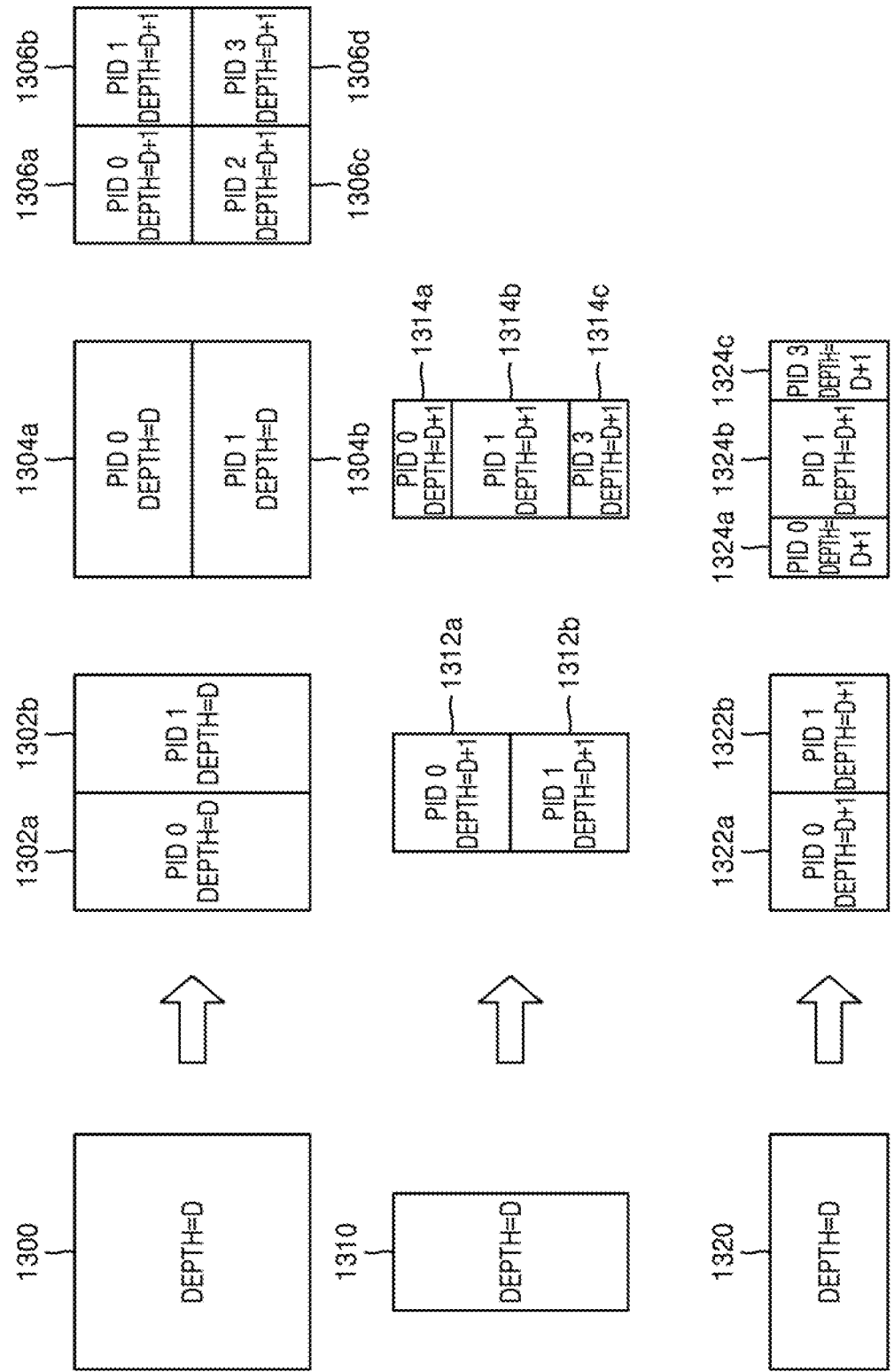
FIG. 13 illustrates depths that are determinable based on shapes and sizes of coding units, and part indexes (PIDs) that are for distinguishing the coding units, according to an embodiment.

FIG. 13 illustrates depth that are determinable based on shapes and sizes of coding units, and part indexes (PIDs) that are for distinguishing the coding units, according to an embodiment.

According to an embodiment, the image decoding device 150 may determine various-shape second coding units by splitting a square first coding unit 1300. Referring to FIG. 13, the image decoding device 150 may determine second coding units 1302a and 1302b, 1304a and 1304b, and 1306a, 1306b, 1306c, and 1306d by splitting the first coding unit 1300 in at least one of vertical and horizontal directions based on split shape information. That is, the image decoding device 150 may determine the second coding units 1302a and 1302b, 1304a and 1306b, and 1306a, 1306b, 1306c, and 1306d, based on the split shape information of the first coding unit 1300.

According to an embodiment, depths of the second coding units 1302*a* and 1302*b*, 1304*a* and 1304*b*, and 1306*a*, 1306*b*, 1306*c*, and 1306*d* that are determined based on the split shape information of the square first coding unit 1300 may be determined based on the length of a long side thereof. For example, because the length of a side of the square first coding unit 1300 equals the length of a long side of the non-square second coding unit 1302*a* and 1302*b*, and 1304 and 1304*b*, the first coding unit 1300 and the non-square second coding units 1302*a* and 1302*b*, and 1304*a* and 1304*b* may have the same depth, e.g., D. However, when the image decoding device 150 splits the first coding unit 1300 into the four square coding units 1306*a*, 1306*b*, 1306*c*, and 1306*d* based on the split shape information, because the length of a side of the square second coding units 1306*a*, 1306*b*, 1306*c*, and 1306*d* is ½ times the length of a side of the first coding unit 1300, a depth of the second coding units 1306*a*, 1306*b*, 1306*c*, and 1306*d* may be D+1 which is deeper than the depth D of the first coding unit 1300 by 1.

According to an embodiment, the image decoding device 150 may determine a plurality of second coding units 1312*a* and 1312*b*, and 1314*a*, 1314*b*, and 1314*c* by splitting a first coding unit 1310, a height of which is longer than a width, in a horizontal direction based on the split shape information. According to an embodiment, the image decoding device 150 may determine a plurality of second coding units 1322*a* and 1322*b*, and 1324*a*, 1324*b*, and 1324*c* by splitting a first coding unit 1320, a width of which is longer than a height, in a vertical direction based on the split shape information.

According to an embodiment, a depth of the second coding units 1312*a* and 1312*b*, 1314*a*, 1314*b* and 1314*c*, 1322*a* and 1322*b*, and 1324*a*, 1324*b*, and 1324*c*, which are determined based on the split shape information of the non-square first coding unit 1310 or 1320, may be determined based on the length of a long side thereof. For example, because the length of a side of the square second coding units 1312*a* and 1312*b* is ½ times the length of a long side of the first coding unit 1310 having a non-square shape, a height of which is longer than a width, a depth of the square second coding units 1312*a* and 1312*b* is D+1 which is deeper than the depth D of the non-square first coding unit 1310 by 1.

Furthermore, the image decoding device 150 may split the non-square first coding unit 1310 into an odd number of second coding units 1314*a*, 1314*b*, and 1314*c* based on the split shape information. The odd number of second coding units 1314*a*, 1314*b*, and 1314*b* may include the non-square second coding units 1314*a* and 1314*c* and the square second coding unit 1314*b*. In this case, because the length of a long side of the non-square second coding units 1314*a* and 1314*c* and the length of a side of the square second coding unit 1314*b* are ½ times the length of a long side of the first coding unit 1310, a depth of the second coding units 1314*a*, 1314*b*, and 1314*c* may be D+1 which is deeper than the depth D of the non-square first coding unit 1310 by 1. The image decoding device 150 may determine depths of coding units split from the first coding unit 1320 having a non-square shape, a width of which is longer than a height, by using the above-described method of determining depths of coding units split from the first coding unit 1310.

According to an embodiment, the image decoding device 150 may determine PIDs for identifying split coding units, based on a size ratio between the coding units when an odd number of split coding units do not have equal sizes. Referring to FIG. 13, a coding unit 1314*b* of a center location among an odd number of split coding units 1314*a*, 1314*b*, and 1314*b* may have a width being equal to that of the other coding units 1314*a* and 1314*c* and a height being twice that of the other coding units 1314*a* and 1314*c*. That is, in this case, the coding unit 1314*b* at the center location may include two of the other coding units 1314*a* or 1314*c*. Therefore, when a PID of the coding unit 1314*b* at the center location is 1 based on a scan order, a PID of the coding unit 1314*c* located next to the coding unit 1314*b* may be increased by 2 and thus may be 3. That is, discontinuity in PID values may be present. According to an embodiment, the image decoding device 150 may determine whether an odd number of split coding units do not have equal sizes, based on whether discontinuity is present in PIDs for identifying the split coding units.

According to an embodiment, the image decoding device 150 may determine whether to use a specific splitting method, based on PID values for identifying a plurality of coding units determined by splitting a current coding unit. Referring to FIG. 13, the image decoding device 150 may determine an even number of coding units 1312*a* and 1312*b* or an odd number of coding units 1314*a*, 1314*b*, and 1314*c* by splitting the first coding unit 1310 having a rectangular shape, a height of which is longer than a width. The image decoding device 150 may use PIDs indicating respective coding units so as to identify the respective coding units. According to an embodiment, the PID may be obtained from a sample at a preset location of each coding unit (e.g., a top left sample).

According to an embodiment, the image decoding device 150 may determine a coding unit at a preset location from among the split coding units, by using the PIDs for distinguishing between the coding units. According to an embodiment, when the split shape information of the first coding unit 1310 having a rectangular shape, a height of which is longer than a width, indicates to split a coding unit into three coding units, the image decoding device 150 may split the first coding unit 1310 into three coding units 1314*a*, 1314*b*, and 1314*c*. The image decoding device 150 may assign a PID to each of the three coding units 1314*a*, 1314*b*, and 1314*c*. The image decoding device 150 may compare PIDs of an odd number of split coding units so as to determine a coding unit at a center location from among the coding units. The image decoding device 150 may determine the coding unit 1314*b* having a PID corresponding to a middle value among the PIDs of the coding units, as the coding unit at the center location from among the coding units determined by splitting the first coding unit 1310. According to an embodiment, the image decoding device 150 may determine PIDs for distinguishing between split coding units, based on a size ratio between the coding units when the split coding units do not have equal sizes. Referring to FIG. 13, the coding unit 1314*b* generated by splitting the first coding unit 1310 may have a width being equal to that of the other coding units 1314*a* and 1314*c* and a height being twice that of the other coding units 1314*a* and 1314*c*. In this case, when the PID of the coding unit 1314*b* at the center location is 1, the PID of the coding unit 1314*c* located next to the coding unit 1314*b* may be increased by 2 and thus may be 3. When the PID is not uniformly increased as described above, the image decoding device 150 may determine that a coding unit is split into a plurality of coding units including a coding unit having a size different from that of the other coding units. According to an embodiment, when the split shape information indicates to split a coding unit into an odd number of coding units, the image decoding device 150 may split a current coding unit in such a manner that a coding unit of a preset location among an odd number of coding units (e.g., a coding unit of a center location) has a size different from that of the other coding units. In this case, the image decoding device 150 may determine the coding unit of the center location, which has a different size, by using PIDs of the coding units. However, the PIDs and the size or location of the coding unit of the present location are not limited to the above-described examples, and various PIDs and various locations and sizes of coding units may be used.

According to an embodiment, the image decoding device 150 may use a preset data unit where a coding unit starts to be recursively split.

Figure 14:
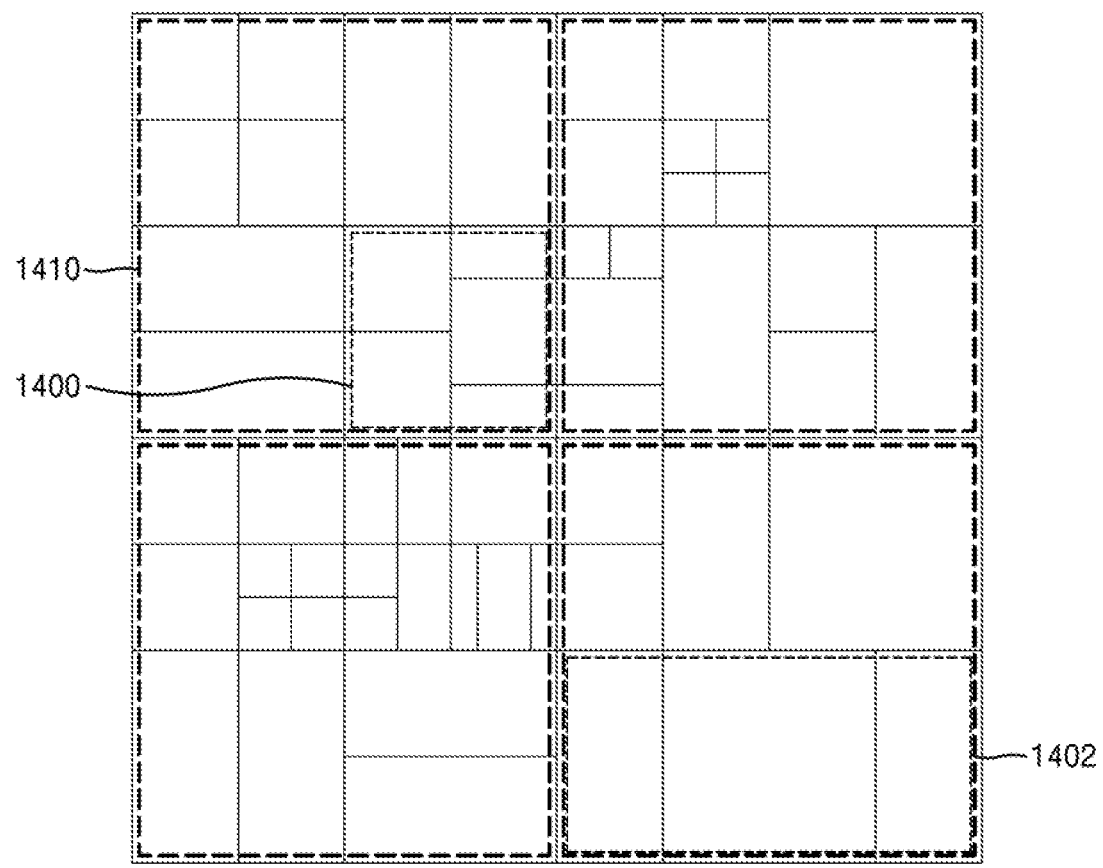
FIG. 14 illustrates that a plurality of coding units are determined based on a plurality of preset data units included in a picture, according to an embodiment.

FIG. 14 illustrates that a plurality of coding units are determined based on a plurality of preset data units included in a picture, according to an embodiment.

According to an embodiment, a preset data unit may be defined as a data unit where a coding unit starts to be recursively split by using at least one of block shape information and split shape information. That is, the preset data unit may correspond to a coding unit of an uppermost depth, which is used to determine a plurality of coding units split from a current picture. In the following descriptions, for convenience of explanation, the preset data unit is referred to as a reference data unit.

According to an embodiment, the reference data unit may have a preset size and a preset size shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding device 100 may split the current picture into a plurality of reference data units. According to an embodiment, the image decoding device 150 may split the plurality of reference data units, which are split from the current picture, by using split information about each reference data unit. The operation of splitting the reference data unit may correspond to a splitting operation using a quadtree structure.

According to an embodiment, the image decoding device 150 may previously determine the minimum size allowed for the reference data units included in the current picture. Accordingly, the image decoding device 150 may determine various reference data units having sizes equal to or greater than the minimum size, and may determine one or more coding units by using the block shape information and the split shape information with reference to the determined reference data unit.

Referring to FIG. 14, the image decoding device 150 may use a square reference coding unit 1400 or a non-square reference coding unit 1402. According to an embodiment, the shape and size of reference coding units may be determined based on various data units capable of including one or more reference coding units (e.g., sequences, pictures, slices, slice segments, largest coding units, or the like).

According to an embodiment, the obtainer 160 of the image decoding device 150 may obtain, from a bitstream, at least one of reference coding unit shape information and reference coding unit size information with respect to each of the various data units. An operation of determining at least one coding unit included in the square reference coding unit 1400 has been described above in relation to the operation of splitting the current coding unit 1000 of FIG. 10, and an operation of determining at least one coding unit included in the non-square reference coding unit 1402 has been described above in relation to the operation of splitting the current coding unit 1100 or 1150 of FIG. 11. Thus, detailed descriptions thereof will not be provided herein.

According to an embodiment, the image decoding device 150 may use a PID for identifying the size and shape of the reference coding units, to determine the size and shape of reference coding units according to some data units previously determined based on a preset condition. That is, the receiver 160 may obtain, from the bitstream, only the PID for identifying the size and shape of reference coding units with respect to each slice, slice segment, or largest coding unit which is a data unit satisfying a preset condition (e.g. a data unit having a size equal to or smaller than a slice) among the various data units (e.g., sequences, pictures, slices, slice segments, largest coding units, or the like). The image decoding device 150 may determine the size and shape of reference data units with respect to each data unit, which satisfies the preset condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding device 150 may determine at least one of the size and shape of reference coding units included in a data unit serving as a unit for obtaining the PID, by selecting the previously determined at least one of the size and shape of reference coding units based on the PID.

According to an embodiment, the image decoding device 150 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding device 150 may determine the reference coding units by splitting the largest coding unit n times based on a quadtree structure, and may split the reference coding unit based on at least one of the block shape information and the split shape information according to various embodiments.

Figure 15:
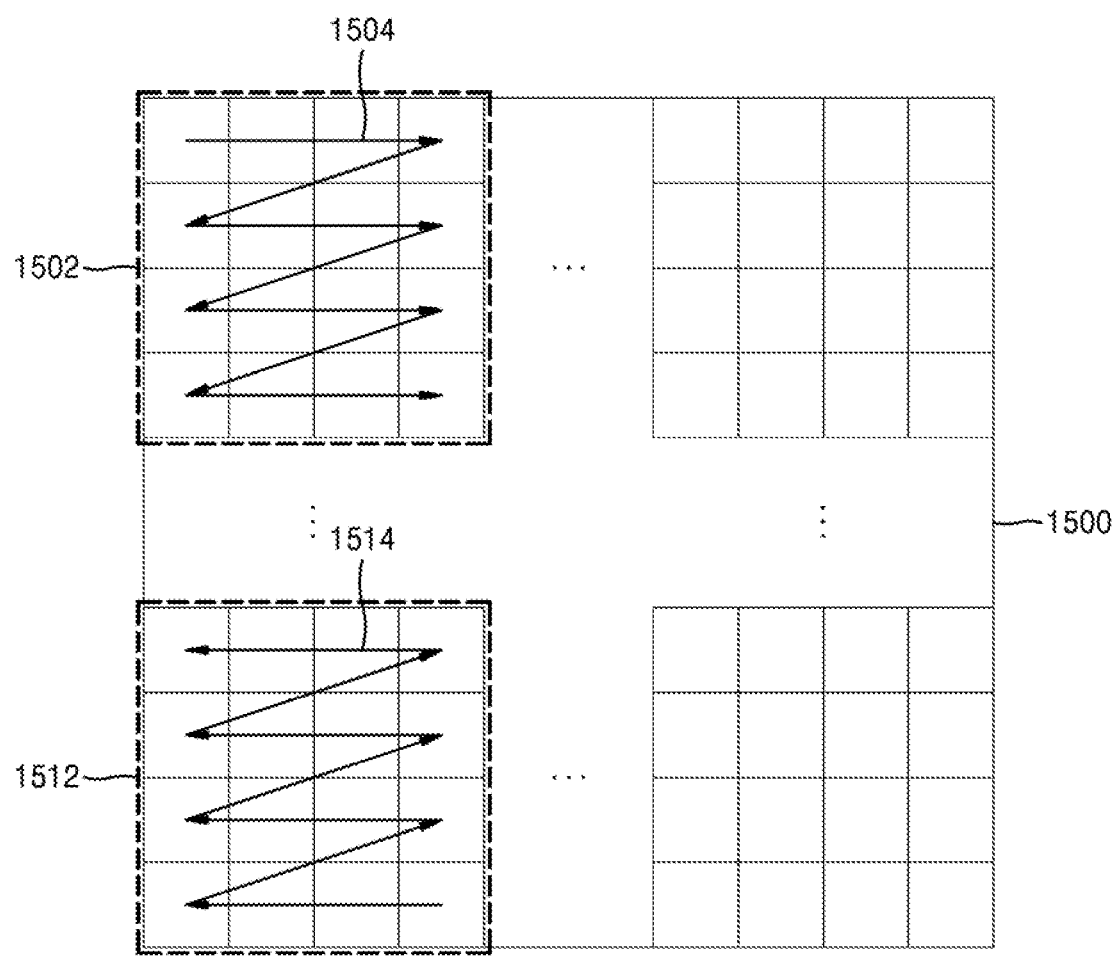
FIG. 15 illustrates a processing block serving as a unit for determining a determination order of reference coding units included in a picture, according to an embodiment.

FIG. 15 illustrates a processing block serving as a unit for determining a determination order of reference coding units included in a picture 2300, according to an embodiment.

According to an embodiment, the image decoding device 150 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding device 150 may obtain processing block size information and may determine the size of one or more processing blocks included in the picture. The image decoding device 150 may obtain the processing block size information from a bitstream and may determine the size of one or more processing blocks included in the picture. The size of processing blocks may be a preset size of data units, which is indicated by the processing block size information.

According to an embodiment, the receiver 160 of the image decoding device 150 may obtain the processing block size information from the bitstream according to each specific data unit. For example, the processing block size information may be obtained from the bitstream in a data unit such as an image, sequence, picture, slice, or slice segment. That is, the receiver 160 may obtain the processing block size information from the bitstream according to each of the various data units, and the image decoding device 150 may determine the size of one or more processing blocks, which are split from the picture, by using the obtained processing block size information. The size of the processing blocks may be integer times that of the reference coding units.

According to an embodiment, the image decoding device 150 may determine the size of processing blocks 1502 and 1512 included in the picture 1500. For example, the image decoding device 150 may determine the size of processing blocks based on the processing block size information obtained from the bitstream. Referring to FIG. 15, according to an embodiment, the image decoding device 150 may determine a width of the processing blocks 1502 and 1512 to be four times the width of the reference coding units, and may determine a height of the processing blocks 1502 and 1512 to be four times the height of the reference coding units. The image decoding device 150 may determine a determination order of one or more reference coding units in one or more processing blocks.

According to an embodiment, the image decoding device 100 may determine the processing blocks 1502 and 1512, which are included in the picture 1500, based on the size of the processing blocks, and may determine a determination order of one or more reference coding units in the processing blocks 1502 and 1512. According to an embodiment, determination of reference coding units may include determination of the size of the reference coding units.

According to an embodiment, the image decoding device 150 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding device 150 may obtain, from the bitstream, the determination order information of reference coding units according to each specific data unit. For example, the receiver 160 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding device 150 may determine one or more reference coding units based on the determined determination order.

According to an embodiment, the receiver 160 may obtain the determination order information of reference coding units from the bitstream as information related to the processing blocks 1502 and 1512, and the image decoding device 150 may determine a determination order of one or more reference coding units included in the processing blocks 1502 and 1512 and determine one or more reference coding units, which are included in the picture 2300, based on the determination order. Referring to FIG. 15, the image decoding device 150 may determine determination orders 1504 and 1514 of one or more reference coding units in the processing blocks 1502 and 1512, respectively. For example, when the determination order information of reference coding units is obtained with respect to each processing block, different types of the determination order information of reference coding units may be obtained for the processing blocks 1502 and 1512. When the determination order 1504 of reference coding units in the processing block 1502 is a raster scan order, reference encoding units included in the processing block 1502 may be determined according to a raster scan order. On the contrary, when the determination order 1514 of reference coding units in the other processing block 1512 is a backward raster scan order, reference coding units included in the processing block 1512 may be determined according to the backward raster scan order.

A method of splitting the video into a largest coding unit and splitting the large coding unit into coding units of a hierarchical tree structure is described with reference to FIGS. 1 to 15. A method of determining an encoding mode applicable to the current picture according to temporal layer depths of the current picture is described with reference to FIGS. 16 to 27.

Figure 16:
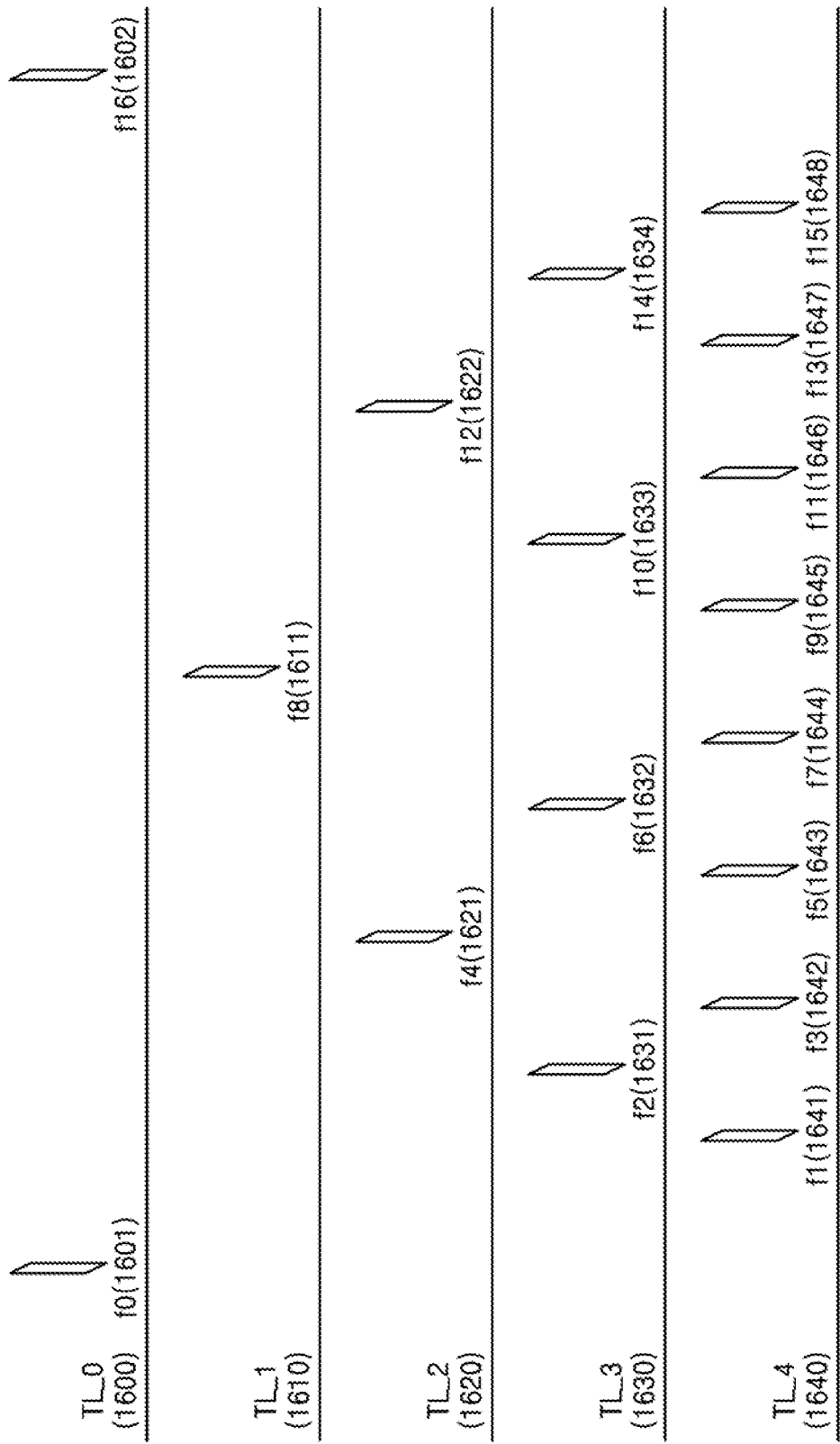
FIG. 16 illustrates temporal layer depths of a plurality of pictures included in a video sequence.

FIG. 16 illustrates temporal layer depths of a plurality of pictures included in a video sequence.

A temporal layer depth indicates to a temporal level of a temporal layer defined according to a hierarchical encoding structure of the pictures. The hierarchical encoding structure is determined according to an encoding order of the pictures and a reference relationship between the pictures.

In a group of pictures (referred to as GOP hereinafter), a temporal layer depth of pictures to be encoded first without referring other pictures is determined as 0. Pictures in a lower temporal layer depth are encoded with reference to pictures of an upper temporal layer depth that are previously encoded. For example, pictures in a layer having a temporal layer depth of 2 are encoded with reference to pictures in a layer having a temporal layer depth of 0 or 1. Therefore, the plurality of pictures form the hierarchical encoding structure shown in FIG. 16 according to the encoding order and a reference direction.

GOP shown in FIG. 16 includes sixteen pictures. In addition, the sixteen pictures of GOP are sorted as five temporal layers TL_0 1600, TL_1 1610, TL_2 1620, TL_3 1630, and TL_4 1640, according to encoding order and reference relation between the pictures.

TL_0 1600 is an uppermost layer. TL_0 1600 includes layers having a temporal layer depth of 0. f0 1601 and f16 1062 included in TL_0 1600 do not refer to other pictures and are encoded by intra prediction mode.

TL_1 1610 includes layers having a temporal layer depth of 1. f8 1611 included in TL1 1610 is encoded with reference to f0 1601 and f16 1602 of TL0 1600.

TL_2 1620 includes layers having a temporal layer depth of 2. f4 1621 and f12 1622 included in TL_2 1620 are encoded with reference to f0 1601 and f16 1602 of TL_0 1600 and f8 1611 of TL_1 1610.

TL_3 1630 includes layers having a temporal layer depth of 3. f2 1631, f6 1632, f10 1633, and f14 1634 included in TL_3 1630 are encoded with reference to f0 1601 and f16 1602 of TL_0 1600, f8 1611 of TL_1 1610, and f4 1621 and f12 1622 of TL_2 1620.

TL_4 1640 is a lowermost layer. TL_4 includes layers having a temporal layer depth of 4. f1 1641, f3 1642, f5 1643, f7 1644, f9 1645, f11 1646, f13 1647, and f15 1648 included in TL_4 1640 are encoded with reference to f0 1601 and f16 1602 of TL_0 1600, f8 1611 of TL_1 1610, f4 1621 and f12 1622 of TL_2 1620, and f2 1631, f6 1632, f10 1633, and f14 1634 of TL_3 1630.

As pictures included in TL_4 1640 are not referred by other pictures, TL_4 1640 is referred to as a non-reference layer. A layer depth of TL_4 1640 is referred to as a non-reference layer depth.

On the other hand, pictures that are not included in TL_4 1640 are referred by other pictures, and thus, an upper layer of TL_4 1640 is referred to as a reference layer. A layer depth of the upper layer of the TL_4 1640 is referred to as a reference layer depth.

Encoding modes used for encoding and decoding of the video are used with high frequency when there is no reference picture or there is little similarity between the current picture and the reference picture. Accordingly, pictures in a layer of a small temporal layer depth is encoded and decoded by intra prediction or based on reference pictures having a long temporal distance. Therefore, various encoding mode should be allowed for a picture in a layer of a small temporal layer depth.

However, pictures in a layer of a great temporal layer depth are predicted with reference to pictures having a short temporal distance. Accordingly, as pictures in a layer of a great temporal layer depth are predicted based on reference pictures having a short temporal distance, a skip mode or a merge mode, in which most encoding information is omitted, is likely to be used. Therefore, it is highly possible that a significant number of encoding modes are not applied to pictures in a layer of a great temporal layer depth.

Accordingly, when a layer of a great temporal layer depth is encoded, an encoding mode of low possibility to be applied to pictures in the layer of the great temporal layer depth, and by doing so, encoding of information indicating whether the encoding mode is applied may be omitted. Accordingly, as some encoding modes are not allowed to the current picture according to temporal layer depth, the encoding rate may be improved.

For example, pictures included in TL_4 1640 may refer to pictures included in TL_3 1630 that are temporally close. Therefore, as the pictures included in TL_4 1640 and the pictures included in TL_3 1630 have high similarity, subject image quality may not be severely deteriorated even when only some encoding mode such as the skip mode and merge mode described above are applied. That is, the encoding rate may be increased by setting to not allow an encoding mode such as the affine mode, the overlapped block motion compensation mode, which are of low possibility to be used for the pictures in TL_4 1640. Likewise, the encoding rate may be increased by differently setting encoding modes allowed for TL_0 1600, TL_1 1610, TL_1620, and TL_3 1630.

According to another embodiment, even when an encoding mode is applied to a plurality of layers, an encoding rate may be increased by differently setting block size ranges, to which the encoding mode is applied, for each layer. For example, in an upper layer such as TL_0 1600 and TL_1 1610, the Split Unit Coding Order (SUCO) mode and the like are need to be applied to a block of a small size. However, a small-sized block included in a lower layer such as TL_4 1640 has high possibility to directly refer pixels included in a picture of an upper layer. Accordingly, with respect to a lower layer such as TL_4 1640, a specific encoding mode may be allowed to be applied only to a large-size block.

In conclusion, the encoding rate may be improved by differently setting encoding modes to be allowed for the picture and block sizes to which the encoding modes may be applied, according to temporal layer depths of the picture.

Figure 17:
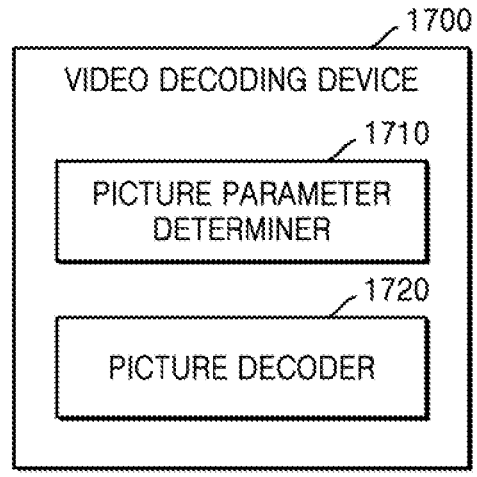
FIG. 17 illustrates a video decoding device according to an embodiment, which determines a plurality of encoding modes applied to a current picture and executes an instruction to decode the current picture according to the plurality of encoding modes.

FIG. 17 illustrates a video decoding device 1700 according to an embodiment, which determines a plurality of encoding modes applied to the current picture and executes an instruction to decode the current picture according to the plurality of encoding modes.

The video decoding device 1700 includes a picture parameter determiner 1710 and a picture decoder 1720. In FIG. 17, although the picture parameter determiner 1710 and the picture decoder 1720 are shown as separate configuration units, according to embodiments, the picture parameter determiner 1710 and the picture decoder 1720 may be integrated and thus implemented as a same configuration unit.

In FIG. 17, although the picture parameter determiner 1710 and the picture decoder 1720 are shown as configuration units in one device, devices respectively in charge of functions of the picture parameter determiner 1710 and the picture decoder 1720 are not necessarily adjacent to each other. Therefore, according to embodiments, the picture parameter determiner 1710 and the picture decoder 1720 may be distributed.

The picture parameter determiner 1710 and the picture decoder 1720 may be executed by a processor, according to embodiments. According to embodiments, the picture parameter determiner 1710 and the picture decoder 1720 may be executed by a plurality of processors. In addition, instructions indicating functions of the picture parameter determiner 1710 and the picture decoder 1720 may be stored in a memory of the video decoding device 1700.

The functions performed in the picture parameter determiner 1710 and the picture decoder 1720 shown in FIG. 17 may be performed in the decoder 180 shown in FIG. 1B.

The picture parameter determiner 1710 may determine encoding modes applicable to the current picture, according to a temporal layer depth of the current picture.

According to an embodiment, when a temporal layer depth of the current picture is greater than a first threshold depth, the picture parameter determiner 1720 may determine to not allow a first encoding mode for encoding of the current picture. On the other hand, when the temporal layer depth of the current picture is smaller than or equal to the first threshold depth, the picture parameter determiner 1710 may determine to allow the first encoding mode for the encoding of the current picture.

According to another embodiment, when the temporal layer depth of the current picture is greater than or equal to the first threshold depth, the picture parameter determiner

1710 may determine to not allow the first encoding mode for encoding of the current picture. On the other hand, when the temporal layer depth of the current picture is smaller than the first threshold depth, the picture parameter determiner 1710 may determine to allow the first encoding mode for encoding of the current picture.

For example, the picture parameter determiner 1710 may determine whether an affine mode may be allowed for the current picture according to the temporal layer depth of the current picture. An affine threshold depth for determining whether to allow the affine mode may be determined as 4 or 3. Alternatively, the affine threshold depth may be determined as a greatest value of the temporal layer depth or a value smaller than the greatest value by 1.

When the affine mode is not allowed for the current picture, the picture decoder 1720 does not apply the affine mode for all blocks in the current picture. Therefore, an affine prediction flag, an affine skip flag, an affine merge flag, and the like indicating whether the affine mode is applied to the blocks is not obtained from the bitstream. Accordingly, due to the omission of the syntax elements, a size of the bitstream may be decreased.

As another example, the picture parameter determiner 1710 may determine whether a space adaptive transform mode may be allowed for the current picture, according to a temporal layer depth of the current picture. A space-adaptive transformation threshold depth for determining whether to allow the space adaptive transform mode may be determined as 4 or 3. Alternatively, the space-adaptive transformation threshold depth may be determined as the greatest value of the temporal layer depth or a value smaller than the greatest value by 1.

When the spatial-adaptive transform mode is not allowed for the current picture, the picture decoder 1720 does not apply the spatial-adaptive transform mode for all blocks in the current picture. Therefore, a spatial-adaptive transformation flag, which indicates whether the spatial-adaptive transform mode is applied to the blocks, and the like, are not obtained from the bitstream. Like in the example of the affine mode, omitting the syntax elements may cause a decrease in size of the bitstream.

Methods such as the embodiments describing the affine mode and the spatial-adaptive transform mode may be applied to other encoding modes.

The picture parameter determiner 1710 may, from a picture parameter set of the current picture, obtain a first encoding mode allowance flag indicating whether to allow a first encoding mode. When the first encoding mode allowance flag indicates allowance of the first encoding mode, the picture parameter determiner 1710 may determine to allow the first encoding mode for encoding of the current picture. On the other hand, when the first encoding mode allowance flag indicates that the first encoding mode is not allowed, the picture parameter determiner 1710 may determine to not allow the first allowance mode for encoding of the current picture.

When a temporal layer depth of the current picture is smaller than or equal to the first threshold value, the picture parameter 1710 may determine whether to allow the first encoding mode for the current picture based on the first encoding mode allowance flag. On the other hand, when the temporal layer depth of the current picture is greater than the first threshold depth, the picture parameter determiner 1710 does not obtain the first encoding mode allowance flag and may determine to not allow the first encoding mode for encoding of the current picture.

The picture parameter determiner 1710 may determine the first threshold depth from first threshold depth information obtained from a sequence parameter or a video parameter set of a sequence or a video including the current picture. After that, the picture parameter determiner 1710 may determine whether the first encoding mode is allowed for encoding of the current picture, based on the first threshold depth.

According to an embodiment, the picture parameter determiner 1710 may determine a range of a size of a first block, to which the first encoding mode is applied, according to temporal layer depths. The picture decoder 1720 may also determine a plurality of blocks by performing hierarchy split on the current picture, and may determine whether to apply the first encoding mode with respect to a block corresponding to the range of the size of the first block from the plurality of blocks. On the contrary, the picture decoder 1720 does not apply the first encoding mode with respect to blocks that do not correspond to the range of the size of the first block.

The size range of the first block may be defined by a number of pixels included in the block. For example, when the size range of the first block is defined as a number of pixels of 256 or more, the size range of the first block may include blocks having sizes of 16×16, 8×32, and 32×8.

Alternatively, the size range of the first block may be determined based on a smaller value between a height and a width of the block. For example, when the first block size range includes having a block, of which a smaller value between a height and width is 16 or greater, the first block size range may include blocks having sizes of 16×16, 16×32, and 32×16.

Alternatively, the size range of the first block may be determined based on split depths of the block. A split depth of the current block indicates a number of executions of block split to obtain the current block from the largest encoding block. For example, the size range of the first block includes a block that has a split depth smaller than or equal to four, the size range of the first block may include a block that is split four times from the largest encoding block.

The split depth may include a first split depth, which increases by quad-tree split, and a second split depth which increases by vertical split and horizontal split. Accordingly, whether the current block is included in the size range of the first block may be determined according to the first split depth and the second split depth of the current block.

The picture parameter determiner 1710 may obtain a correlation between the temporal layer depth and the size range of the first block from the first block size range information obtained from a sequence parameter set of a sequence or a video parameter set of a video including the current picture.

The picture determiner 1720 may determine whether to allow the first encoding mode to a block corresponding to the first block size range, based on the first block size range information and the first block size range determined according to the temporal layer depth.

The picture parameter determiner 1710 may apply the first encoding mode to a picture in a specific temporal layer depth, and may apply the first encoding mode to a picture of other temporal layer depths. In addition, with respect to the specific temporal layer depth to which the first encoding mode is applied, the picture parameter determiner 1710 may differently set the size range of the first block to which the first encoding mode is applied, according to temporal layer depths.

The first block size range information may indicate at least one of a smallest size and shape of the block to which the first encoding mode according to temporal layer depths is applied. The picture parameter determiner 1710 may determine the size range of the first block according to at least one of the smallest size and the shape of the block. The smallest size of the block may be determined according to the smaller value of the height and width of the block, a greater value of the height and width of the block, an area of the block, or a split depth of the block. The shape of the block may be defined according to a ratio between the height and width of the block. For example, the picture parameter determiner 1710 may determine a split unit coding order (SUCO) block size range, to which a SUCO mode is applied, to a temporal layer depth of the current picture. The SUCO mode is an encoding mode of determining an encoding order of a plurality of lower blocks split from upper blocks as one of a positive direction and a negative direction. A block range to which SUCO is applied is determined according to a smallest SUCO block size and a largest SUCO block size. The picture parameter determiner 1710 may determine the smallest SUCO block size and the largest SUCO block size according to a temporal layer depth of the current picture.

For example, the picture parameter determiner 1710 may determine a smallest SUCO block size of pictures having a temporal layer depth of 0 or 1 as a default size (for example, 8×8 or 16×16). The picture parameter determiner 1710 may also determine a smallest SUCO block sizes of pictures having temporal layer depths of 2, 3, and 4 to be larger than a default size. In addition, the picture parameter determiner 1710 may determine that a smallest SUCO block size of the pictures increase according to increase in the temporal layer depth.

Accordingly, a height and width of a smallest SUCO block of a picture having a temporal layer depth of 2 may be determined to be more than twice a height and width of a smallest SUCO block of a picture having a temporal layer depth of 1. Likewise, a height and width of a smallest SUCO block of a picture having a temporal layer depth of 3 may be determined to be more than twice the height and width of the smallest SUCO block of the picture having the temporal layer depth of 2.

A correlation between a temporal layer depth and a smallest SUCO block may be determined based on a sequence parameter set of a sequence or a video parameter set of a video including the current picture. The correlation between a temporal layer depth and a smallest SUCO block is not limited to the embodiments of the disclosure.

In another example, the picture parameter determiner 1710 may determine an affine block range in which the affine mode is determined according to a temporal layer depth of the current picture. The picture parameter determiner 1710 may determine the affine block range as a number of pixels in a smallest affine block.

For example, the number of pixels in the smallest affine block of a picture having a temporal layer depth of 0 may be determined as 64. Therefore, the affine mode may be applied to a 8×8 size block of the picture having the temporal layer depth of 0.

In addition, a number of pixels of a smallest affine block of a picture having a temporal layer depth of 1 may be determined as 128. Therefore, the affine mode may not be applied to a 8×8 size block of the picture having the temporal layer depth of 0. However, the affine mode may be applied to a 16×8 size block of the picture having the temporal layer depth of 1.

Likewise, numbers of pixels of smallest affine blocks of pictures having temporal layer depths of 2, 3, and 4 may be determined as 256, 512, and 1024, respectively.

As another example, a number of pixels in a smallest affine block of a picture having a temporal layer depth of 2 may be determined as 64. A number of pixels in a smallest affine block of a picture having a temporal layer depth of 3 or 4 may be determined as 256. The affine mode may be set not to be applied to a picture having a temporal layer depth equal to or greater 5.

According to an embodiment, the picture parameter determiner 1710 may determine a first encoding parameter used in the first encoding mode, according to a temporal layer depth.

For example, in the merge with motion vector difference mode, the picture parameter determiner 1710 may determine a set of motion vector difference candidates according to a temporal layer depth. As the temporal layer depth is greater, the prediction motion vector has higher accuracy. Therefore, the larger the temporal layer depth, the smaller the size candidate included in the size candidate set of the differential motion vector may be. Alternatively, as the temporal layer depth increases, the number of size candidates included in the size candidate set of the differential motion vector may decrease.

Alternatively, in the decoder-side motion vector refinement mode, the picture parameter determiner 1710 may determine a scan range of refinement motion vector candidates according to temporal layer depths. As described above, as a temporal layer depth increases, accuracy of a basic motion vector increases. Therefore, when the temporal layer depth is great, the scan range of the motion vector candidate may be set small. According to an embodiment, when a temporal layer depth is a non-reference layer depth, the picture parameter determiner 1710 may determine to not allow the first encoding mode for the current picture. On the contrary, when the temporal layer depth is a reference layer depth, the picture parameter determiner 1710 may determine to not allow the first encoding mode for generating the transformation block included in the current picture.

For example, when the temporal layer depth of the current picture is a non-reference layer depth, the picture parameter determiner 1710 may determine to not allow an In-loop Reshaper mode to the current picture. Likewise, when the temporal layer depth of the current picture is a non-reference layer depth, the picture parameter determiner 170 may determine to not allow an Overlapped Block Motion Compensation mode for the current picture.

The first encoding mode described above may be one of a plurality of prediction modes. The plurality of prediction modes may include an affine prediction mode, a position dependent prediction combination mode, an overlapped block motion compensation mode, a merge with motion vector difference mode, a triangle block prediction mode, an intrablock prediction mode, a cross-component linear model mode, a decoder-side motion vector refinement mode, an intra sub-partition mode, a multi-reference intra mode, and an in-loop reshaper mode.

The first encoding mode described above may be one of a plurality of transform modes. The plurality of transform modes may include a multi-core transform mode, a secondary transform mode, and a spatial varying transform mode. In addition, the first encoding mode may be one of block split methods, in-loop filtering methods, and entropy encoding methods used for encoding and decoding the video.

The picture decoder 1720 may generate a prediction and a transform block for a block included in the current block, according to encoding modes applicable to the current picture. In addition, the picture decoder 1720 may reconstruct the current picture by using the prediction block and the transform block.

Figure 18:
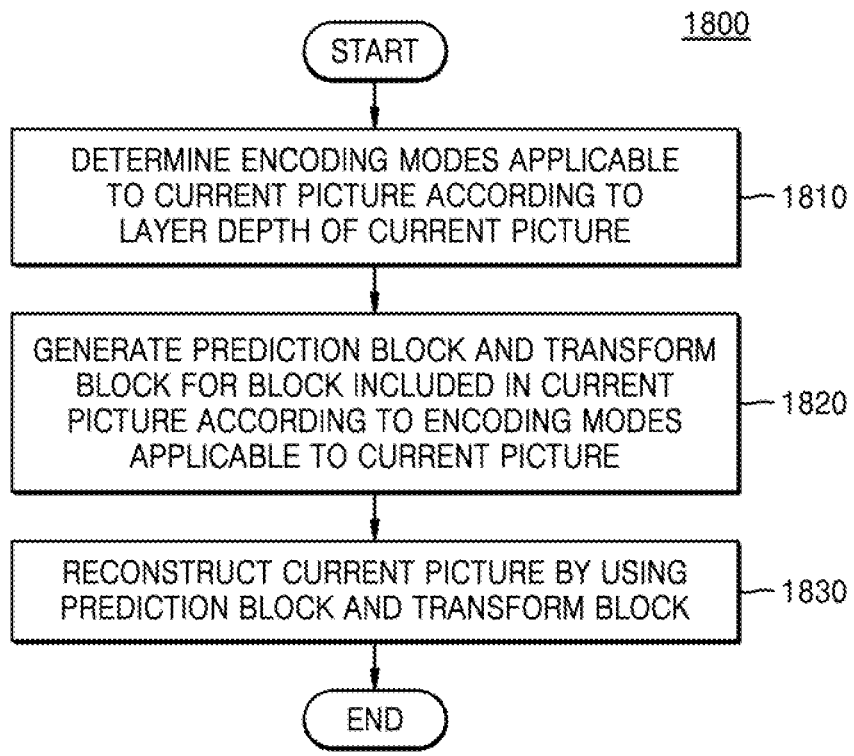
FIG. 18 illustrates a flowchart of a video decoding method performed by a video decoding device.

FIG. 18 shows a flowchart of a video decoding method 1800 performed by the video decoding device 1700 shown in FIG. 17.

In operation 1810, encoding modes applicable to the current picture are determined according to the temporal layer depth of the current picture.

According to an embodiment, when the temporal layer depth is greater than the first threshold depth, it may be determined to not allow the first encoding mode for encoding of the current picture. On the contrary, when the temporal layer depth is smaller than or equal to the first threshold depth, it may be determined to allow the first encoding mode for encoding of the current picture.

According to an embodiment, when the temporal layer depth is smaller than or equal to the first threshold depth, the first encoding mode allowance flag, which indicates whether the first encoding mode is allowed, may be obtained from the picture parameter set of the current picture. On the contrary, when the first encoding mode allowance flag indicates allowance of the first encoding mode, it may be determined to allow the first encoding mode for encoding of the current picture.

According to an embodiment, according to a temporal layer depth, a first block size range to which the first encoding mode is applied may be determined. A smallest size of the block to which the first encoding mode is applied may be determined according to the temporal layer depth, and the size range of the first block may be determined according to the smallest size.

According to an embodiment, when the temporal layer depth is a non-reference layer depth, it may be determined to not allow the first encoding mode for generating the transform block included in the current picture. On the contrary, when the temporal layer depth is a reference layer depth, it may be determined to allow the first encoding mode for generating the transform block included in the current picture.

According to an embodiment, first threshold depth information indicating the first threshold depth may be obtained from a sequence parameter set of a sequence or a video parameter set of a video including the current picture. It may be determined whether to allow the first encoding mode may be allowed for encoding the current picture, based on the first threshold depth determined according to the first threshold depth information.

According to an embodiment, first block size range information indicating a correlation between a temporal layer depth and the first block size range may be obtained from a sequence parameter set of a sequence and a video parameter set of video including the current picture.

In operation 1820, a prediction block and a transform block for a block included in the current picture, according to encoding modes applicable to the current picture.

According to an embodiment, when the block corresponds to the first block size range, it may be determined whether to apply the first encoding mode to the block. When the first encoding mode is applied to the block, a prediction block or a transform block may be generated according to the first encoding mode.

According to an embodiment, it may be determined whether to apply the first encoding mode to the block based on the first block size range information and the first block size range determined according to a temporal layer depth.

In operation 1830, the current picture is reconstructed by using the prediction block and transform block.

The first encoding mode described above may be one of a plurality of prediction modes. The plurality of prediction modes may include an affine prediction mode, a position dependent prediction combination mode, an overlapped block motion compensation mode, a merge with motion vector difference mode, a triangle block prediction mode, an intrablock prediction mode, a cross-component linear model mode, a decoder-side motion vector refinement mode, an intra sub-partition mode, a multi-reference intra mode, and an in-loop reshaper mode.

The first encoding mode described above may be one of a plurality of transform modes. The plurality of transform modes may include a multi-core transform mode, a secondary transform mode, and a spatial varying transform mode. In addition, the first encoding mode may be one of block split methods, in-loop filtering methods, and entropy encoding methods used for encoding and decoding the video.

The video decoding method 1800 shown in FIG. 18 may include a decoding process that may be performed in the video decoding device 1700. Therefore, one of ordinary skill in the art may easily implement combination of embodiments of the video decoding method 1800 and the video decoding process of the video decoding device 1700.

Figure 19:
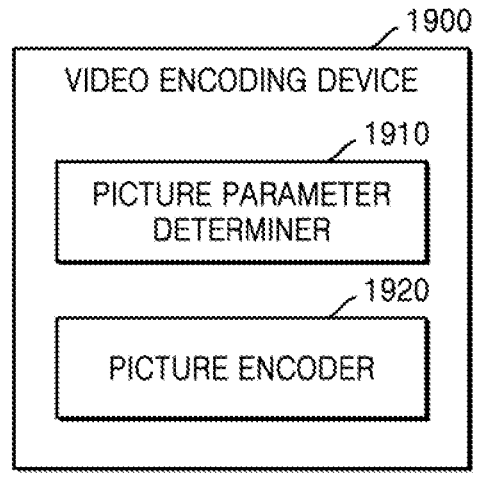
FIG. 19 illustrates a video encoding device according to an embodiment, which determines a plurality of encoding modes applied to a current picture and performs instructions to decode the current picture according to the plurality of encoding modes.

FIG. 19 illustrates a video encoding device 1900 according to an embodiment, which determines a plurality of encoding modes applied to the current picture and executes an instruction to encode the current picture according to the plurality of encoding modes.

The video encoding device 1900 includes a picture parameter determiner 1910 and a picture encoder 1920. In FIG. 19, although the picture parameter determiner 1910 and the picture encoder 1920 are shown as separate configuration units, according to embodiments, the picture parameter determiner 1910 and the picture encoder 1920 may be integrated and implemented as a same configuration unit.

In FIG. 19, although the picture parameter determiner 1910 and the picture decoder 1920 are shown as configuration units in one device, devices respectively in charge of functions of the picture parameter determiner 1910 and the picture decoder 1920 are not necessarily physically adjacent to each other. Therefore, according to embodiments, the picture parameter determiner 1910 and the picture encoder 1920 may be distributed.

The picture parameter determiner 1910 and the picture decoder 1920 may be executed by a processor, according to embodiments. According to embodiments, the picture parameter determiner 1910 and the picture encoder 1920 may be executed by a plurality of processors. In addition, instructions indicating functions of the picture parameter determiner 1910 and the picture encoder 1920 may be stored in a memory of the video encoding device 1900.

The picture parameter 1910 determines a plurality of encoding modes applicable to the current picture, according to a temporal layer depth of the current picture.

According to an embodiment, the picture parameter determiner 1910 may obtain the first threshold depth information indicating the first threshold depth from the sequence parameter set of the sequence or the video parameter set of the video including the current picture. The picture parameter determiner 1910 may compare the first threshold depth, which is indicated by the first threshold depth information, and a temporal layer depth of the current picture. According to a result of the comparison, the picture parameter determiner 1910 may determine whether the first encoding mode is allowed for the current picture. According to the method, the picture parameter determiner 1910 may determine whether each of the first encoding mode to an $n^{th}$ encoding mode is allowed to the current picture.

According to an embodiment, the picture parameter determiner 1910 may obtain the first block size range information indicating the correlation between a temporal layer depth and the first block size range from the sequence parameter set of the sequence or the video parameter set of the video including the current picture. The picture parameter determiner 1910 may determine a block size range, to which the first encoding mode is applicable, according to the temporal layer depth of the current picture and the correlation between the temporal layer depth and the first block size range. A plurality of encoding mode applicable to the current block may be determined by the picture encoder 1920, according to a size of the current block.

According to an embodiment, when a temporal layer depth of the current picture is a non-reference layer depth, the picture parameter determiner 1910 may determine to not allow the first encoding mode for the current picture. On the contrary, when a temporal layer depth of the current picture is a reference layer depth, the picture parameter determiner 1910 may determine to allow the first encoding mode for the current picture.

The picture encoder 1920 determines an encoding mode applied to the block included in the current picture from among the plurality of encoding modes applicable to the current picture.

According to an embodiment, when a size of the current picture in the current picture is included in the first block size range, the picture determiner 1920 may determine whether to apply the first encoding mode to the current block.

The picture encoder 1920 generates a bitstream that includes information indicating an encoding mode applied to a block included in the current picture.

According to an embodiment, when the first encoding mode is allowed for the current picture, the picture encoder 1920 may generate first encoding mode information indicating whether the first encoding mode is applied to the current block. On the contrary, when the first encoding mode is not allowed for the current picture, the picture encoder 1920 does not generate the first encoding mode information about the current block.

According to an embodiment, when a size of the current block is included in the first block size range, the picture encoder 1920 may generate the first encoding mode information indicating whether to apply the first encoding mode to the current block. On the contrary, when the size of the current block is not included in the first block size range, the picture encoder 1920 does not generate first encoding mode information indicating whether to apply the first encoding block to the current block.

The picture encoder 1920 does not generate encoding mode information about an encoding mode that is not allowed to the current block. As described above, by omitting the generation of the encoding mode information, the encoding rate may be improved.

The video encoding device 1900 shown in FIG. 19 may execute an encoding method corresponding to the functions of the video decoding device 1700 shown in FIG. 17. Therefore, one of ordinary skill in the art may easily apply the encoding method, which corresponds to the decoding method of the video decoding device 1700, to the video encoding device 1900.

Figure 20:
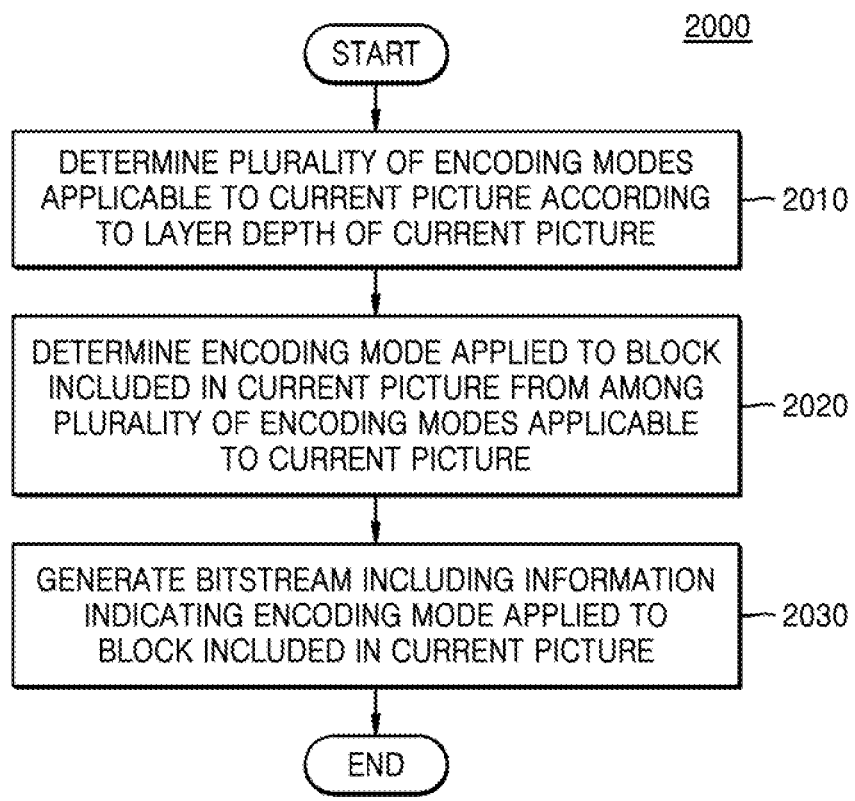
FIG. 20 illustrates a flowchart of a video encoding method performed by a video encoding device.

FIG. 20 shows a flowchart of the video decoding method 2000 performed by the video encoding device 1900 shown in FIG. 19.

In operation 2010, a plurality of encoding modes applicable to the current picture may be determined according to temporal layer depths of the current picture.

In operation 2020, an encoding mode applied to the block included in the current picture may be determined from the plurality of encoding modes applicable to the current picture.

In operation 2030, bitstream including information indicating an encoding mode applied to the block included in the current picture may be generated.

A video encoding method 2000 shown in FIG. 20 may include an encoding process that may be performed in the video encoding device 1900. Therefore, one of ordinary skill in the art may easily implement combination of embodiments of the video encoding method 2000 described above and the encoding process of the video encoding device 1900.

Figure 21:
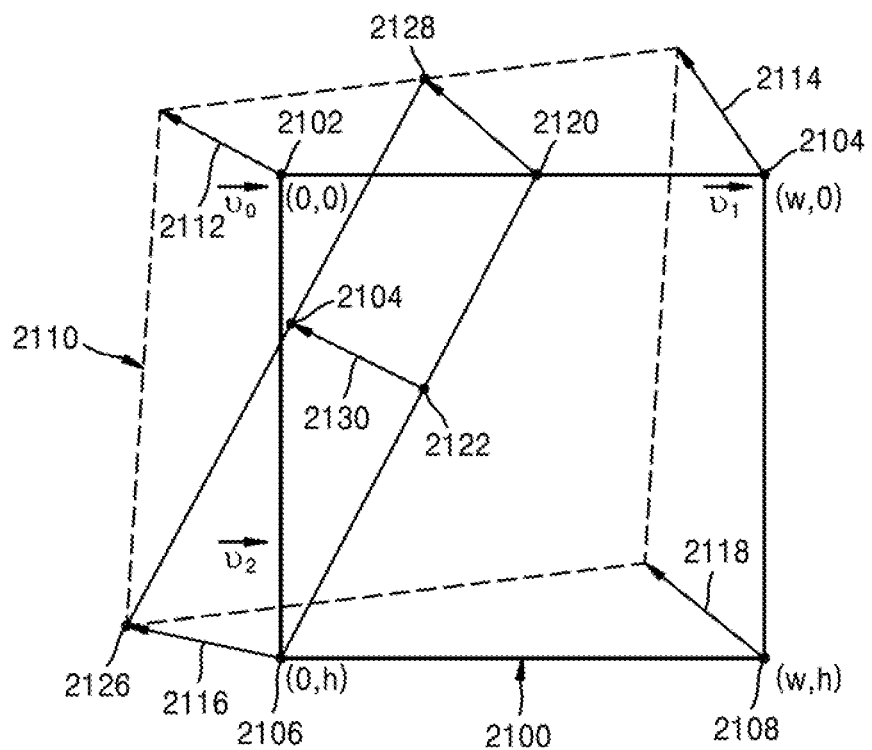
FIG. 21 describes a prediction method according to an affine mode.

A prediction method according to affine modes is described with reference to FIG. 21. Upsizing or downsizing, rotation, perspective and other irregular movements of an object may be found in the image. The affine mode using affine transform may be used to precisely predict motions of the object.

Affine transformation indicates transformation on two affine spaces preserving a collinear point. Here, an affine space is a geometric structure obtained by generalizing a Euclidean space. In the affine space, characteristics about measurement of distances and angles are not maintained, and only collinearity between dots, parallelism between lines, and ratio of lines between dots on a same line are maintained. That is, according to affine transformation, straight lines and whether the straight lines are in parallel are maintained, and directions and angles of the straight lines, a distance between the straight lines, and areas are not preserved. Therefore, when the object is upsized or downsized, or rotates, a region including the object in the image may be precisely predicted according to an affine motion compensation prediction mode.

The affine transformation briefly described with reference to FIG. 21. Four vertices 2102, 2104, 2106, and 2108 of a block 2100 respectively correspond to motion vectors 2112, 2114, 2116, and 2118. An affine transform block 2110 is formed by performing affine transformation on the block by the motion vectors 2112, 2114, 2116, and 2118. Samples in the block 2100 may be matched with samples in the affine transform block 2110.

For example, a sample 2124 obtained by performing affine transformation on a sample 2122 on a segment of a line connecting a vertex 2106 and a sample 2120 at a top center of the block is on a segment of a line that connects a sample 2126 of the affine transform block 2110 indicated by the motion vector 2116 of the vertex 2106 and a sample 2128 of the affine transform block 2110 indicated by the motion vector 2130 of the sample 2120. A location of the affine-transformed sample 2124 may be determined by the motion vector 2130 that is obtained by performing linear interpolation on the motion vectors 2112, 2114, 2116, and 2118 according to a location of the sample 2122. Likewise, other samples in the block 2100 may also undergo affine transformation and be matched with the samples in the affine transform block 2110. As described with reference to FIG. 21, all samples in the block may undergo inter prediction by using a motion vector generated for affine transformation.

The video decoding device 1700 of FIG. 17 and the video encoding device 1900 of FIG. 19 may determine whether the affine mode using affine transformation is allowed according to a temporal layer depth of a picture.

Figure 22:
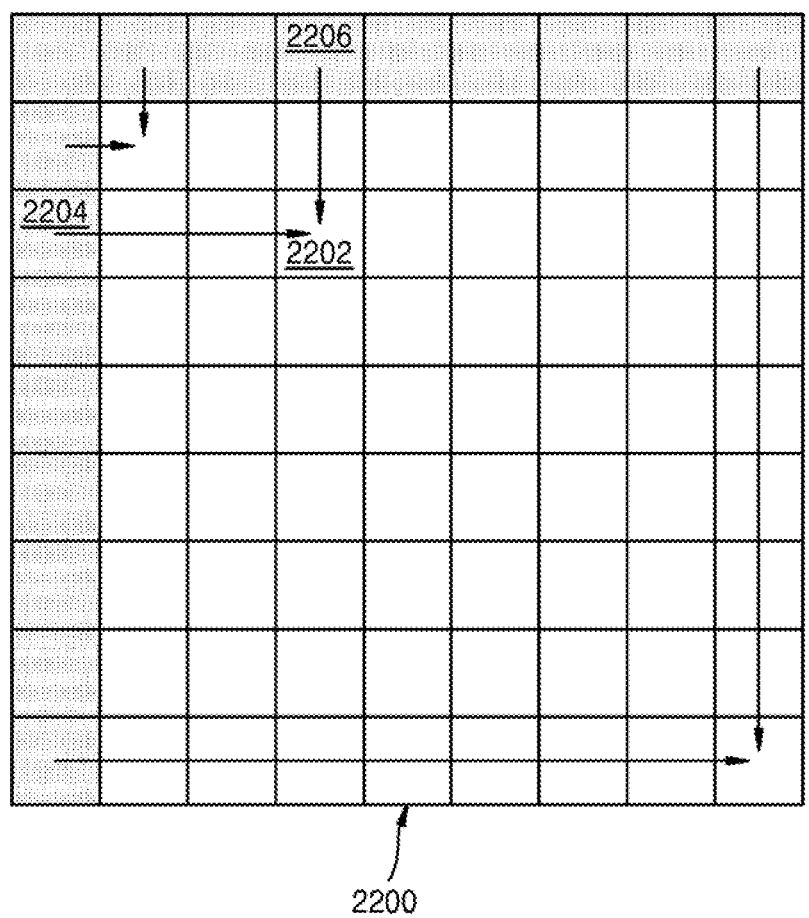
FIG. 22 shows a prediction method of a current block according to a position dependent prediction combination mode.

FIG. 22 shows a prediction method of a current block according to a position dependent prediction combination mode. In a position dependent prediction combination mode, two or more reference samples for prediction of the current sample are determined according to the location of the current sample. A value of the prediction of the current sample is determined as a weighted average value of sample values of the two or more reference samples. A weight used for determining the weighted average value is determined according to distances between the current sample and the reference samples.

FIG. 22 illustrates a method of predicting the current block according to the position dependent prediction combination mode, based on left and upper reference samples of the current block 2200. A prediction value of the sample 2202 is determined as a weight average value of sample values of the left reference sample 2204 and the upper reference sample 2206 of the sample 2202. Weights applied to the left reference sample and the upper reference sample 2206 is determined according to a distance between the sample 2202 and the left reference sample 2204 and a distance between the sample 2202 and the upper reference sample 2206.

For example, a weight applied to the left reference sample 2204 may be determined in proportion to the distance between the sample 2202 and the upper reference sample 2206. A weight applied to the upper reference sample 2206 may be determined in proportion to the distance between the sample 2202 and the left reference sample 2204. Accordingly, the weight applied to the left reference sample 2204 may be determined as 2, and the weight applied to the upper reference sample 2206 may be determined as 3. When a sample value of the left reference sample 2204 is 130 and a sample value of the upper reference sample 2206 is 80, a prediction value of the sample 2202 is determined as 100, that is, a weight average according to the weights ((130×2+80×3)/(2+3)=100).

Other samples in the current block 2200 are also predicted by a same method as that of the sample 2202.

The video decoding device 1700 of FIG. 17 and the video encoding device 1900 of FIG. 19 may determine whether the position dependent prediction combination mode is allowed according to a temporal layer depth of the picture.

Figure 23:
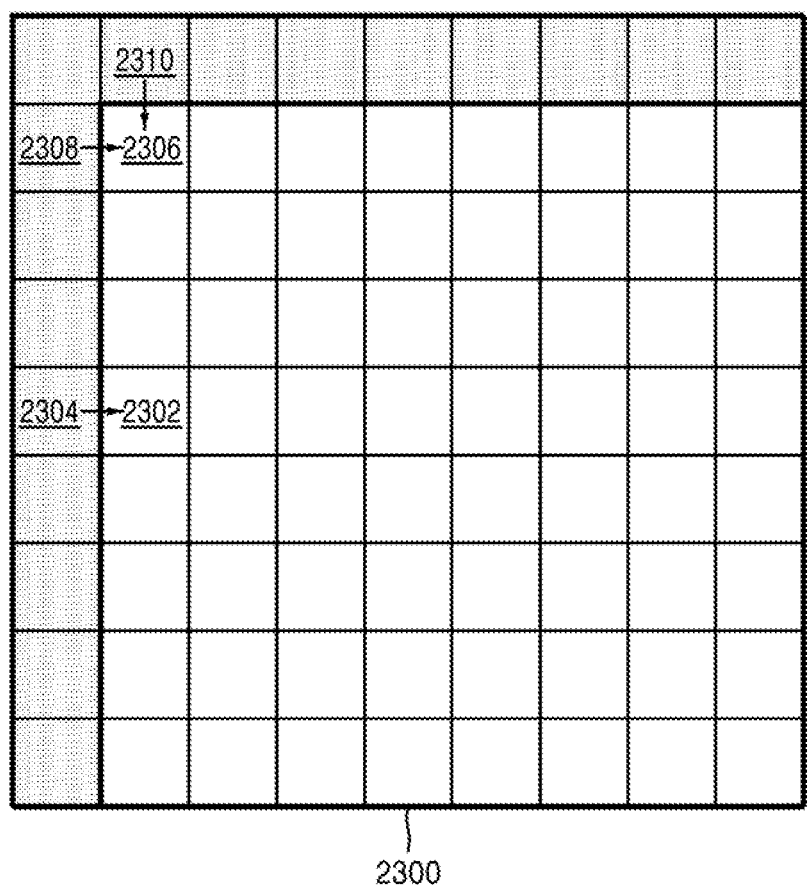
FIG. 23 describes a prediction method of an overlapped block motion compensation mode.

A prediction method of an overlapped block motion compensation mode is described with reference to FIG. 23. In the overlapped block motion prediction mode, a plurality of prediction values of the current sample at a boundary of the current block is obtained by using a motion vector of the current block and a motion vector of a block adjacent to the current block. A final prediction value of the current sample is obtained by weighing and averaging the plurality of prediction values. With respect to a weight average, in general, a weight for a current motion vector is greater than a weight for an adjacent motion vector.

For example, with respect to a sample 2302 at a left boundary of the current block 2300, a current motion vector of the current block 2300 is obtained, and an adjacent motion vector is obtained from a left block of the current block 2300 including a left sample 2304 of the sample 2302. A final prediction value of the sample is determined by weighing and averaging a prediction value obtained by the current motion vector and a prediction value obtained by the adjacent motion vector.

In a sample 2306 adjacent both of the left boundary and the upper boundary of the current block 2300, the current motion vector of the current block 2300 is obtained, a first adjacent motion vector is obtained from the left blocks of the current block 2300 including the left sample 2308 of the sample 2306, and a second adjacent motion vector is obtained from the upper blocks of the current block 2300 including the upper sample 2310 of the sample 2306. And the final prediction value of the sample is obtained by weighing and averaging a prediction value obtained by the current motion vector, a prediction value obtained by the first adjacent motion vector, and a prediction value obtained by the second adjacent motion vector.

The video decoding device 1700 of FIG. 17 and the video encoding device 1900 of FIG. 19 may determine whether the overlapped block motion compensation mode is allowed according to a temporal layer depth of a picture.

Figure 24:
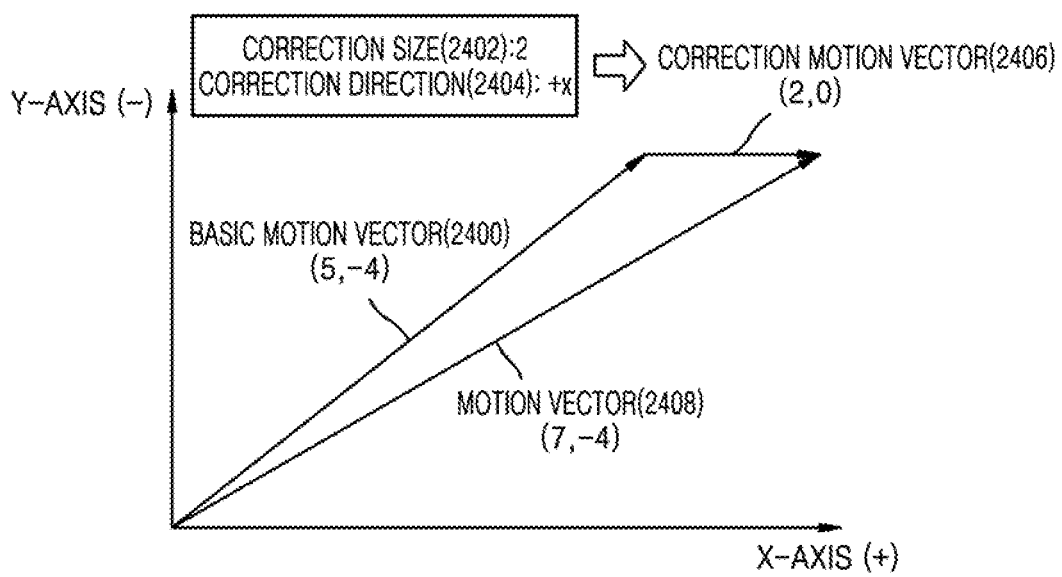
FIG. 24 describes inter-prediction based on a merge with motion vector difference mode.

Inter prediction based on a merge with motion vector difference mode is described in detail with reference to FIG. 24. According to FIG. 24, a basic motion vector 2400 of the current block is (5, −4). However, when a reference block indicated by the basic motion vector 2400 is incorrect, encoding efficiency of the current block may decrease. Therefore, in the merge with motion vector difference mode, the basic motion vector 2400 may be corrected according to a correction size 2402 and a correction direction 2404.

For example, when the correction size 2402 is 2 and the correction direction 2404 is +x direction, a correction motion vector 2406 for correcting the basic motion vector 2400 is determined as (2, 0). A sum vector (7, −4) of the basic motion vector 2400 and the correction motion vector 2406 is determined as a motion vector 2408 of the current block. Accordingly, the current block may be predicted by the motion vector 2408 indicating a current reference block. Therefore, in the merge with motion vector difference mode, accuracy of prediction may be improved by correcting the basic motion vector 2400.

In the merge with motion vector difference mode, to reduce size of information required for correction of the basic motion vector 2400, the corrected size 2402 and the corrected direction 2404 each have a restricted number of candidates. For example, when the corrected size 2402 is determined from among eight corrected size candidates, corrected size information indicating the corrected size 2402, according to truncated unary code, may be expressed by from a minimum of 1 bit to a maximum of 7 bits. Likewise, when the corrected direction 2404 is determined from among four corrected direction candidates (+x, −x, +y, and −y), corrected direction information indicating the corrected direction 2404 may be expressed by 2 bits. Therefore, a bit rate required for determining the correction vector 2406 is limited to 9 bits. Accordingly, in the merge with motion vector difference mode, as a bit rate required for determining the corrected motion vector 2406 is restricted to be equal to or smaller than a preset size, compression efficiency may increase.

The video decoding device 1700 of FIG. 17 and the video encoding device 1900 of FIG. 19 may determine whether the merge with motion vector difference mode is allowed according to a temporal layer depth of a picture.

A cross-component linear model and a reference region referred in the cross-component linear model are described with reference to FIG. 25. The cross-component linear model mode is a prediction mode for predicting a chroma block from a luma block at a same position. The cross-component linear model mode determines a reference region in which both a luma sample and a chroma sample are decoded, obtains a linear relationship between a sample value of the luma sample and a sample value of the chroma sample from the reference region, and predicts the chroma block according to the linear relationship.

Figure 25:
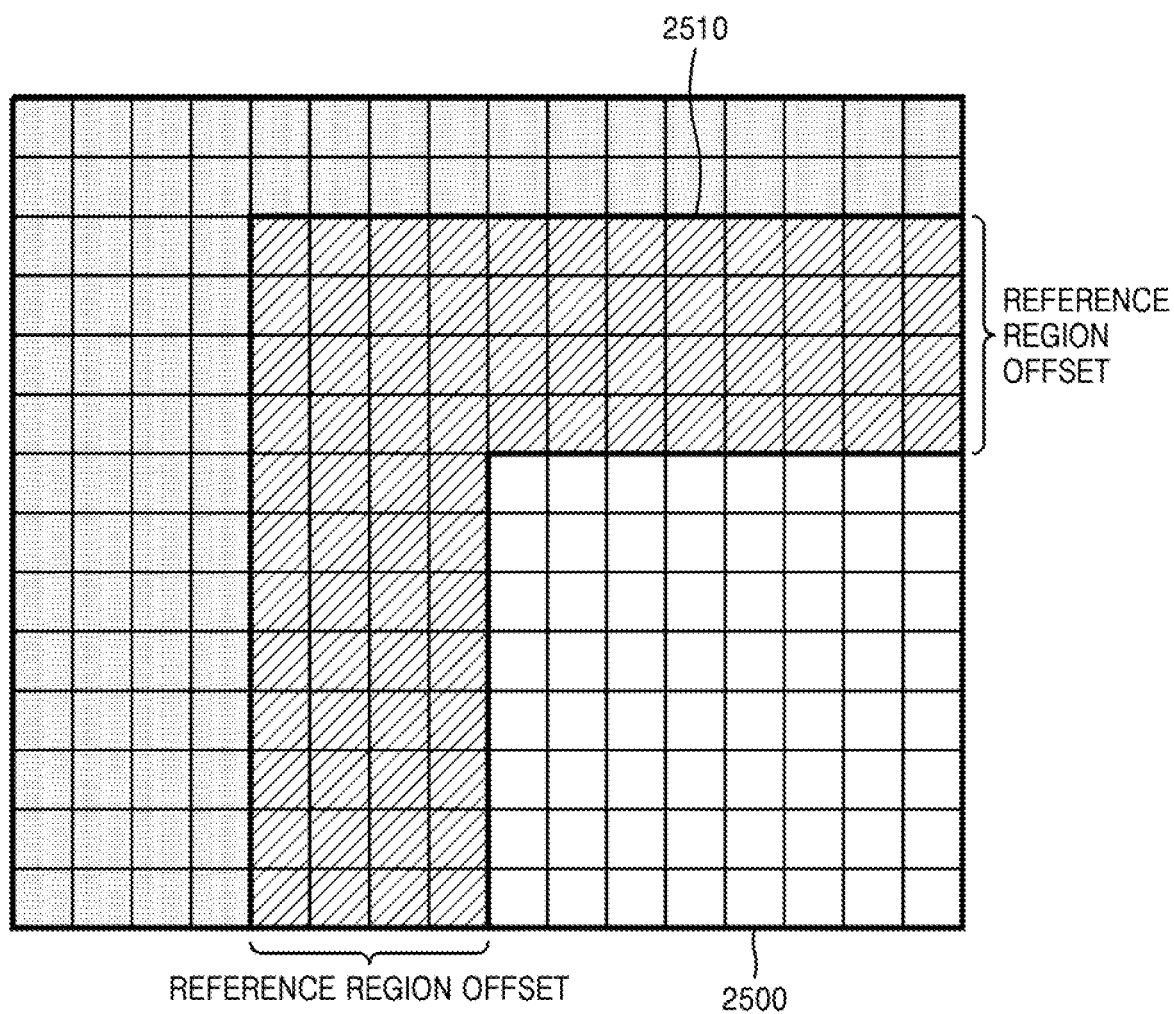
FIG. 25 describes a cross-component linear model mode and a reference region referred in the cross-component linear model mode FIG. 26 describes a prediction method of a decoder-side motion vector refinement mode.

According to FIG. 25, left, upper, and left upper blocks of the current block 2500 are decoded prior to the current block 2500. Therefore, a reference region 2510 is set in the left, upper, and left upper directions.

A width of the reference region 2510 of FIG. 25 is determined according to a reference region offset. The reference region offset may be determined by a size of the current block 2500 or encoding information obtained from the bitstream.

The video decoding device 1700 of FIG. 17 and the video encoding device 1900 of FIG. 19 may determine whether the cross-component linear mode is allowed according to a temporal layer depth of a picture.

Figure 26:
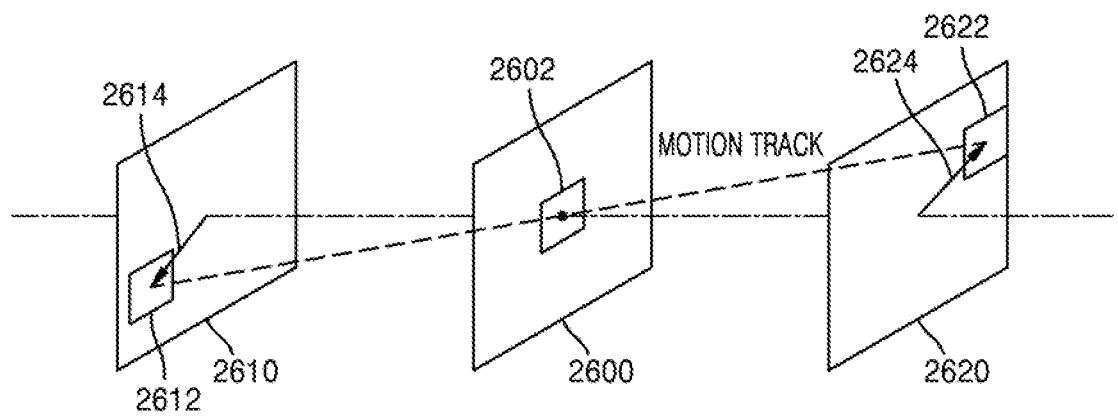

A prediction method of decoder-side motion vector refinement mode is described with reference to FIG. 26. The decoder-side motion vector refinement mode is an inter prediction mode for searching a motion vector of the current block under assumption that there is continuity of motions between continuous pictures. Therefore, the decoder-side motion vector refinement mode is applied to a block on which pair prediction is performed.

According to the decoder-side motion vector refinement mode, the basic motion vector of the current block is obtained from a plurality of motion vector candidates. After determining the basic motion vector of the current block, a refined motion vector having a matching accuracy higher than that of the basic motion vector may be derived by scanning around a point to which the basic motion vector of the current block points.

The matching accuracy may be determined according to a sum of absolute differences (hereinafter referred to as SAD) between pixels included in two reference blocks to which two motion vectors point. When a SAD according to two motion vectors is small, the two motion vectors are determined to have an accurate matching accuracy for the current block.

Therefore, the SAD for the basic motion vector and a SAD of refined motion vector candidates, in which some of x coordinate values and y coordinate values of the basic motion vectors are refined, are compared to each other. From among the basic motion vector and the refined motion vector candidates, a motion vector candidate having a least SAD is determined as a refined motion vector.

For example, the basic motion vector may be first determined for a first reference picture 2610 and a second reference picture 2620. A refined motion vector having a less SAD between the reference blocks is determined by scanning around points 2612 and 2622 indicated by the basic motion vector for the first reference picture 2610 and the second reference picture 2620. The current block 2602 may be predicted by the refined motion vector.

The video decoding device 1700 of FIG. 17 and the video encoding device 1900 of FIG. 19 may determine whether the decoder-side motion vector refinement mode is allowed according to a temporal layer depth of a picture.

Figure 27:
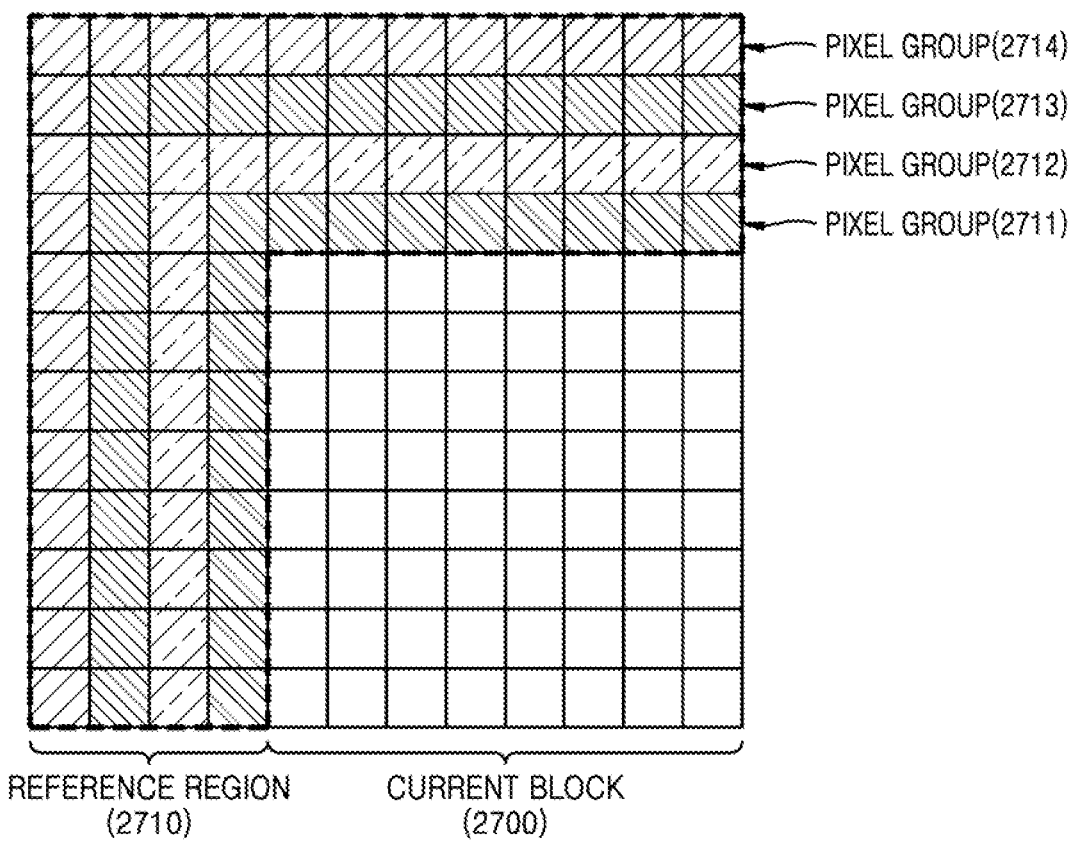
FIG. 27 describes a multi-reference intra mode.

A multi-reference intra mode is described with reference to FIG. 27. In the multi-reference intra mode, a reference pixel group candidate referred to by the current block is determined from among a plurality of reference pixel group candidates distinguished according to pixel distances from the current block.

For example, when a current block 2700 is intra predicted, reference pixels included in a reference region 2710 around the current block 2700 may be referred. In FIG. 27, a reference pixel group 2711 immediately adjacent to the current block 2700, a reference pixel group 2712 one pixel away from the current block 2700, a reference pixel group 2713 two pixels away from the current block 2700, and a reference pixel group 2714 three pixels away from the current block 2700 are determined as reference pixel group candidates of the current block 2700.

From among the four reference pixel group candidates, a reference pixel group candidate most appropriate for prediction of the current block 2700 is determined as a reference pixel group of the current block. Accordingly, in the multi-reference intra mode, a reference pixel that is not immediately adjacent to the current block may also be used for intra prediction of the current block.

The video decoding device 1700 of FIG. 17 and the video encoding device 1900 of FIG. 19 may determine whether a multi reference intra mode is allowed according to a temporal layer depth of a picture.

In the triangle block prediction mode mentioned in the present specification, the current block is split into two triangle sub blocks, and the two triangle sub blocks are predicted independent of each other.

In the intra block prediction mode described herein, unlike in inter mode, a reference block indicated by a motion vector is determined from the current picture. The intra block prediction mode is mainly applied to screen contents that are artificially created.

In the intra sub-partition mode described herein, the current block is split into a plurality of sub-partitions, and the sub-partitions are reconstructed according to a preset encoding order. In a usual intra prediction mode, the sub-partitions are reconstructed by determining a prediction block and a transform block for all of the blocks. However, in the intra sub-partition mode, a first sub-partition is reconstructed by first performing prediction and transformation of the first partition that is in a first place of an encoding order. A second sub-partition is reconstructed with reference the reconstructed first sub-partition. Accordingly, prediction accuracy of the intra sub-partition mode may be higher than prediction accuracy of a general intra prediction mode.

The video decoding device 1700 of FIG. 17 and the video encoding device 1900 of FIG. 19 may determine whether the triangle block prediction mode is allowed, whether the intra block prediction mode is allowed, and/or whether the intra sub-partition mode is allowed according to a temporal layer depth of a picture.

In the SUCO mode described herein, an encoding order between lower blocks split from a same upper block may be changed. For example, when the upper block is split into a left block and right block and it is better for prediction of the lower block to refer to the right block of the upper block, the right block may be predicted in prior to the left block in the SUCO mode. The video decoding device 1700 of FIG. 17 and the video encoding device 1900 of FIG. 19 may determine whether the SUCO mode is allowed according to a temporal layer depth of a picture.

In a secondary transform mode described herein, when a current transform block is split into a plurality of sub-sets, after a primary transform with respect to the current transform block, secondary transform is performed with respect to a left upper subset including a low frequency component. Secondary transform with respect to the left upper subset is mainly rotation transform.

In the spatial adaptive transform mode described herein, a transform method is differently determined according to a shape of the current transform block. Therefore, transform methods may be differently determined when the current transform block is square, a rectangle longer in a vertical direction, and a rectangle longer in a horizontal direction.

The video decoding device 1700 of FIG. 17 and the video encoding device 1900 of FIG. 19 may determine whether the multi core transform mode, the secondary transform mode, and the spatial-adaptive transform mode are allowed according to a temporal layer depth of the picture.

According to a video encoding method based on coding units having the tree structure described above with reference to FIGS. 1 through 19, image data in a spatial region is encoded in each coding unit of the tree structure, decoding is performed for each largest coding unit based on a video decoding method based on the coding units of the tree structure, and by doing so, image data of the spatial region is reconstructed, and a picture and a video that is a picture sequence may be reconstructed. The reconstructed video may be played by a player, stored in a storage medium, or transmitted through network.

Embodiments of the present disclosure described above may be made into a program that may be executed by a computer and may be implemented in a general-purpose digital computer operating the program by using a computer-readable recording medium.

Although the present disclosure is described with most suitable embodiments, other embodiments, of which substitution, modification, and refinements are applied to the present disclosure will be clearly understood to one of ordinary skill according to the description. In other words, claims are interpreted as including all of the substitution, modification, and refinements of the embodiments. Therefore, all of descriptions in the specification and the drawings are to be interpreted as illustrative and non-limited.

The invention claimed is:

1. A video decoding method comprising:
determining encoding modes applicable to a current picture, according to a temporal layer depth of the current picture;
generating a prediction block and a transform block for a block included in the current picture, according to the encoding modes applicable to the current picture; and
reconstructing the current picture by using the prediction block and the transform block,
wherein the determining of the encoding modes applicable to the current picture comprises:
determining to not allow a first encoding mode for encoding of the current picture when the temporal layer depth is greater than a first threshold depth; and
determining to allow the first encoding mode for encoding of the current picture when the temporal layer depth is smaller than or equal to the first threshold depth, and
wherein the determining to allow the first encoding mode comprises:
obtaining a first encoding mode allowance flag indicating whether to allow the first encoding mode from a bitstream when the temporal layer depth is smaller than or equal to the first threshold depth;
determining to allow the first encoding mode for encoding of the current picture when the first encoding mode allowance flag indicates that the first encoding mode is allowed; and
determining to not allow the first encoding mode for encoding of the current picture when the first encoding mode allowance flag indicates that the first encoding mode is not allowed.

2. The video decoding method of claim 1, further comprising:
obtaining first threshold depth information indicating the first threshold depth, from a sequence parameter set of a sequence or a video parameter set of a video including the current picture, and
wherein the determining of the encoding modes applicable to the current picture comprises determining whether the first encoding mode is allowed for encoding of the current picture based on the first threshold depth determined according to the first threshold depth information.

3. The video decoding method of claim 1, wherein the determining of the encoding modes applicable to the current picture comprises determining, according to the temporal layer depth, a first block size range to which the first encoding mode is applied, and
the generating of the prediction block and the transform block comprises:
determining whether to apply the first encoding mode to the block when the block corresponds to the first block size range; and
generating the prediction block or the transform block of the block according to the first encoding mode when the first encoding mode is applied to the block.

4. The video decoding method of claim 3, further comprising obtaining first block size range information indicating a correlation between the temporal layer depth and the first block size range from a sequence parameter set of a sequence or a video parameter set of a video including the current picture, and
the determining of whether to apply the first encoding mode to the block comprises, determining whether to apply the first encoding mode to the block based on the first block size range information and a first block size range determined according to the temporal layer depth.

5. The video decoding method of claim 3, wherein the determining of the first block size range comprises determining at least one of a smallest size or shape of a block to which the first encoding mode is applied, according to the temporal layer depth, and determining the first block size range according to the at least one of the smallest size or shape of the block, and
the smallest size of the block is a smaller value between a height and width of the block, a greater value between the height and width of the block, an area of the block, or a split depth of the block, and
the shape of the block is a ratio between the height and the width of the block.

6. The video decoding method of claim 1, wherein determining to not allow the first encoding mode for the current picture when the temporal layer depth is a non-reference layer depth.

7. The video decoding method of claim 1, further comprising determining a first encoding parameter applied to the current picture, according to the temporal layer depth of the current picture, and
wherein the generating of the prediction block and the transform block for the block included in the current picture, according to the encoding modes applicable to the current picture, comprises:
generating the prediction block and the transform block for the block according to the first encoding parameter when the first encoding mode is applied to the block.

8. The video decoding method of claim 1, wherein the encoding modes comprise a plurality of prediction modes, and the plurality of prediction modes comprise at least one of an affine prediction mode, a position dependent prediction combination mode, an overlapped block motion compensation mode, a merge with motion vector difference mode, a triangle block prediction mode, an intra block prediction mode, a cross-component linear model mode, a decoder-side motion vector refinement mode, an intra sub-partition mode, a multi-reference intra mode, or an in-loop reshaper mode.

9. The video decoding method of claim 1, wherein the encoding modes comprise a plurality of transform modes, and the plurality of transform modes comprise at least one of a multi-core transform mode, a secondary transform mode, or a spatial varying transform mode.

10. A video decoding device comprising:
at least one memory; and
a processor configured to execute instructions stored in the at least one memory,
wherein the instructions include
determining encoding modes applicable to a current picture, according to a temporal layer depth of the current picture,
generating a prediction block and a transform block for a block included in the current picture, according to the encoding modes applicable to the current picture, and
reconstructing the current picture by using the prediction block and the transform block,
wherein the determining of the encoding modes applicable to the current picture comprises:
determining to not allow a first encoding mode for encoding of the current picture when the temporal layer depth is greater than a first threshold depth; and
determining to allow the first encoding mode for encoding of the current picture when the temporal layer depth is smaller than or equal to the first threshold depth, and wherein a first encoding mode allowance flag, indicating whether to allow the first encoding mode from a bitstream, is generated when the temporal layer depth is smaller than or equal to the first threshold depth.

11. A video encoding method comprising:
determining a plurality of encoding modes applicable to a current picture, according to a temporal layer depth of the current picture;
determining an encoding mode applied to a block included in the current picture from the plurality of encoding modes applicable to the current picture; and
generating a bitstream including information indicating the encoding mode applied to the block included in the current picture,
wherein the determining of the encoding modes applicable to the current picture comprises:
determining to not allow a first encoding mode for encoding of the current picture when the temporal layer depth is greater than a first threshold depth; and
determining to allow the first encoding mode for encoding of the current picture when the temporal layer depth is smaller than or equal to the first threshold depth, and
wherein a first encoding mode allowance flag, indicating whether to allow the first encoding mode to be included in the bitstream is generated when the temporal layer depth is smaller than or equal to the first threshold depth.

12. A non-transitory computer-readable recording medium having recorded thereon a program for executing the video decoding method of claim 1.

13. A non-transitory computer-readable recording medium having recorded thereon a program for executing the video encoding method of claim 11.

* * * * *